United States Patent
Zhang

(10) Patent No.: US 10,520,595 B2
(45) Date of Patent: Dec. 31, 2019

(54) POSITIONING METHOD, APPARATUS, AND MOBILE TERMINAL

(71) Applicant: Huawei Technologies Co., Ltd., Shenzhen (CN)

(72) Inventor: Xiaoping Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 291 days.

(21) Appl. No.: 15/502,004

(22) PCT Filed: Aug. 5, 2014

(86) PCT No.: PCT/CN2014/083686
§ 371 (c)(1),
(2) Date: Feb. 6, 2017

(87) PCT Pub. No.: WO2016/019504
PCT Pub. Date: Feb. 11, 2016

(65) Prior Publication Data
US 2017/0234980 A1  Aug. 17, 2017

(51) Int. Cl.
*H04L 12/14* (2006.01)
*G01S 13/46* (2006.01)
(Continued)

(52) U.S. Cl.
CPC .......... *G01S 13/46* (2013.01); *G01S 5/0263* (2013.01); *G01S 5/0294* (2013.01); *G01S 5/12* (2013.01)

(58) Field of Classification Search
CPC ...................................................... H04L 12/14
(Continued)

(56) References Cited

U.S. PATENT DOCUMENTS 6,393,046 B1 * 5/2002 Kohli ................. G01C 21/26
                                                          375/130
6,400,753 B1 * 6/2002 Kohli ................. G01C 21/26
                                                          375/130
(Continued)

FOREIGN PATENT DOCUMENTS

CN          1794862 A       6/2006
CN          1834688 A       9/2006
(Continued)

OTHER PUBLICATIONS

Machine Translation and Abstract of Chinese Publication No. CN1859798, Part 1, Nov. 8, 2006, 7 pages.
(Continued)

*Primary Examiner* — William D Cumming
(74) *Attorney, Agent, or Firm* — Conley Rose, P.C.

(57) ABSTRACT

A positioning method and a mobile terminal in order to improve track fitting precision, eliminate erroneous track determining, improve a positioning presentation effect, and automatically set a suitable positioning frequency. The method includes determining, by the mobile terminal, an expected journey L, where the expected journey is an expected value of a distance traveled by the mobile terminal between two consecutive times of positioning, obtaining a speed value v of the mobile terminal, adjusting a positioning frequency according to the expected journey L and the speed value v of the mobile terminal such that a deviation of a distance traveled by the mobile terminal between two consecutive times of positioning from the expected journey L is less than a specified threshold, and performing positioning according to an adjusted positioning frequency.

20 Claims, 21 Drawing Sheets

(51) Int. Cl.
*G01S 5/02* (2010.01)
*G01S 5/12* (2006.01)

(58) Field of Classification Search
USPC ........................................ 455/456.2; 340/990
See application file for complete search history.

(56) References Cited

U.S. PATENT DOCUMENTS

| | | | | |
|---|---|---|---|---|
| 6,633,814 | B2* | 10/2003 | Kohli | G01C 21/26 375/E1.002 |
| 6,724,811 | B2* | 4/2004 | Kohli | G01C 21/26 375/130 |
| 6,748,015 | B2* | 6/2004 | Kohli | G01C 21/26 375/149 |
| 7,406,114 | B2* | 7/2008 | Kohli | G01C 21/26 375/134 |
| 7,962,285 | B2* | 6/2011 | Breed | G01C 21/20 701/472 |
| 9,651,651 | B1* | 5/2017 | Bietz | G01S 5/021 |
| 10,241,194 | B2* | 3/2019 | Bietz | G01S 5/28 |
| 2002/0015439 | A1* | 2/2002 | Kohli | G01C 21/26 375/148 |
| 2002/0146065 | A1* | 10/2002 | Kohli | G01C 21/26 375/150 |
| 2002/0150150 | A1* | 10/2002 | Kohli | G01C 21/26 375/150 |
| 2004/0136446 | A1* | 7/2004 | Kohli | G01C 21/26 375/150 |
| 2004/0202235 | A1* | 10/2004 | Kohli | G01C 21/26 375/150 |
| 2004/0219932 | A1* | 11/2004 | Verteuil | H04L 12/14 455/456.2 |
| 2008/0154495 | A1* | 6/2008 | Breed | G01C 21/12 701/472 |
| 2009/0030605 | A1* | 1/2009 | Breed | B60N 2/2863 701/532 |
| 2009/0140887 | A1* | 6/2009 | Breed | G01C 21/165 340/990 |
| 2011/0270476 | A1* | 11/2011 | Doppler | B60L 15/2045 701/22 |
| 2013/0029686 | A1 | 1/2013 | Moshfeghi | |
| 2017/0234980 | A1* | 8/2017 | Zhang | G01S 13/46 342/458 |
| 2018/0231634 | A1* | 8/2018 | Bietz | G01S 5/28 |

FOREIGN PATENT DOCUMENTS

| | | |
|---|---|---|
| CN | 1859798 A | 11/2006 |
| CN | 102076082 A | 5/2011 |
| CN | 202916932 U | 5/2013 |
| JP | 2013257774 A | 12/2013 |

OTHER PUBLICATIONS

Machine Translation and Abstract of Chinese Publication No. CN1859798, Part 2, Nov. 8, 2006, 3 pages.
Foreign Communication From a Counterpart Application, PCT Application No. PCT/CN2014/083686, English Translation of International Search Report dated May 8, 2015, 2 pages.
Foreign Communication From a Counterpart Application, PCT Application No. PCT/CN2014/083686, English Translation of Written Opinion dated May 8, 2015, 7 pages.

* cited by examiner

L = d1

L = d2 (>d1)

L = d3 (>d2)

L = d4 (>d3)

Speed that is of a mobile terminal and obtained between two consecutive times of positioning Traveled distance obtained by means of accumulative calculation

POSITIONING METHOD, APPARATUS, AND MOBILE TERMINAL

CROSS-REFERENCE TO RELATED APPLICATIONS

This application is a U.S. national stage of International Patent Application No. PCT/CN2014/083686 filed on Aug. 5, 2014, which is hereby incorporated by reference in its entirety.

TECHNICAL FIELD

The present disclosure relates to the communications field, and in particular, to a positioning method, an apparatus, and a mobile terminal.

BACKGROUND

Positioning is one of main applications of short-range wireless technologies. Wireless positioning technologies such as ZIGBEE, ULTRA-WIDEBAND (UWB), ultrasonic wave ultrasonic, and a radio frequency identification device (RFID) have been studied for many years, and related mature products have emerged on the market. The wireless positioning technologies are widely applied to many fields such as personnel positioning, asset tracking, garage management, indoor navigation, logistics management, and production scheduling. Recent years set off an upsurge of research on new wireless positioning technologies such as BLUETOOTH Low Energy (BLE) and WiFi in the industry, and particularly, enormous market demand and commercial value exist in the indoor positioning field and the location based service (LBS) field. A positioning technology often exposes various technical problems when used in diversified engineering practices. In addition to positioning precision, a positioning presentation effect and a track fitting effect also have strong impact on actual application and user experience, especially on surveillance management and safety protection applications such as personnel positioning (in an underground mine, a substation, a factory workshop, and the like), asset tracking, and production scheduling. Therefore, in a positioning application oriented towards a moving target and a complex and variable scenario, how to improve a positioning presentation effect and a track fitting effect of the positioning application, improve a capability of a product to adapt to diversified positioning applications, and improve user experience and production competitiveness becomes a focus of attention of wireless positioning product and technology research and development workers.

During positioning, an existing wireless positioning product (such as a wireless tag) broadcasts a wireless signal on a fixed frequency (such as a common frequency of 1 hertz (Hz)). A user can set a wireless broadcast frequency value by means of, for example, an upgrade over the air. A broadcast frequency of a wireless tag can be regarded as a system positioning frequency or a positioning refreshing frequency, and a result that the user sees on a display terminal is a position located each time when the wireless tag broadcasts a wireless signal on the frequency. To prolong battery life, some new products integrate an acceleration sensor into a tag to detect stillness and movement of the tag such that the tag can be dormant during stillness, and broadcast a signal on a specified frequency during movement to perform wireless positioning. For example, an in-vehicle positioning apparatus determines, according to a speed of a positioning carrier, whether a vehicle is in a running state or in a stop state. Two time intervals are set for the positioning apparatus according to different states of the vehicle to send a positioning report. Different time intervals are used in the running state and the stop state, but a time interval used in each state is fixed.

However, positioning performed on a fixed broadcast frequency easily causes erroneous determining of a traveling track when the traveling track of a target needs to be fitted and a reached position needs to be analyzed. When a traveling speed of a target is excessively fast in a geometrically complex environment, positions of the target between two consecutive times of positioning have a farther distance. In addition, a positioning error exists, and therefore positioning positions at all moments are so scattered that erroneous determining of the traveling track is easily caused. Particularly, for a positioning application particularly sensitive to a traveling track because of operating instructions, job management, and a security issue, erroneous track determining causes an unintended consequence. As shown in FIG. 1, a track 101 is an actual track of a mobile terminal. However, because distances between four positioning position points are excessively far, the track is erroneously determined as a track 102 shown in the figure.

SUMMARY

Embodiments of the present disclosure provide a positioning method, an apparatus, and a mobile terminal in order to improve track fitting precision and eliminate erroneous track determining.

A first aspect of the embodiments of the present disclosure provides a positioning method, including determining, by a mobile terminal, an expected journey L, where the expected journey is an expected value of a distance traveled by the mobile terminal between two consecutive times of positioning, obtaining, by the mobile terminal, a speed value v of the mobile terminal, adjusting, by the mobile terminal, a positioning frequency according to the expected journey L and the speed value v of the mobile terminal such that a deviation of a distance traveled by the mobile terminal between two consecutive times of positioning performed by the mobile terminal according to an adjusted positioning frequency from the expected journey L is less than a specified threshold, and performing, by the mobile terminal, positioning according to the adjusted positioning frequency.

With reference to the first aspect of the embodiments of the present disclosure, in a first implementation manner of the first aspect of the embodiments of the present disclosure, adjusting, by the mobile terminal, a positioning frequency according to the expected journey L and the speed value v of the mobile terminal further includes obtaining, by the mobile terminal, a second positioning time t of the mobile terminal according to the expected journey L and the speed value v of the mobile terminal when triggering a first positioning operation, and performing, by the mobile terminal, positioning according to the adjusted positioning frequency includes triggering, by the mobile terminal, a second positioning operation at the second positioning time t.

With reference to the first implementation manner of the first aspect of the embodiments of the present disclosure, in a second implementation manner of the first aspect of the embodiments of the present disclosure, obtaining, by the mobile terminal, a second positioning time t of the mobile terminal according to the expected journey L and the speed value v of the mobile terminal includes obtaining, by the mobile terminal, a time interval T according to the formula T=L/v, that is, the time interval T is equal to a ratio of the expected journey L to the speed value v of the mobile terminal, where the second positioning time t of the mobile terminal is a sum value of a current moment determined by the mobile terminal and the time interval T.

With reference to the first implementation manner of the first aspect of the embodiments of the present disclosure, in a third implementation manner of the first aspect of the embodiments of the present disclosure, adjusting, by the mobile terminal, a positioning frequency according to the expected journey L and the speed value v of the mobile terminal includes obtaining, by the mobile terminal, a traveled distance L' of the mobile terminal by performing integration on the speed value v of the mobile terminal in terms of time starting from a time point at which a first positioning operation is triggered, and adjusting, by the mobile terminal, the positioning frequency according to the traveled distance L' and the expected journey L.

With reference to any one of the first aspect to the third implementation manner of the first aspect of the embodiments of the present disclosure, in a fourth implementation manner of the first aspect of the embodiments of the present disclosure, determining, by a mobile terminal, an expected journey L includes obtaining, by the mobile terminal, a positioning error R and lengths of closed paths that surround all unreachable regions in a positioning scenario, determining, by the mobile terminal, a value range of the expected journey L as $2R<L<(C/2)$ when a minimum closed path length C is greater than 4R, or determining, by the mobile terminal, a value range of the expected journey L as $2R<L<(C_1/2)$ when a minimum closed path length C is not greater than 4R, where $C_1$ is a minimum closed path length greater than 4R, and receiving, by the mobile terminal, an expected journey L selected by a user from the value range of the expected journey L.

With reference to any one of the first aspect to the third implementation manner of the first aspect of the embodiments of the present disclosure, in a fifth implementation manner of the first aspect of the embodiments of the present disclosure, determining, by a mobile terminal, an expected journey L includes determining, by the mobile terminal, a current positioning scenario, and determining, by the mobile terminal according to a preset correspondence between a positioning scenario and an expected journey, the expected journey L corresponding to the current positioning scenario.

With reference to any one of the first aspect to the fifth implementation manner of the first aspect of the embodiments of the present disclosure, in a sixth implementation manner of the first aspect of the embodiments of the present disclosure, adjusting, by the mobile terminal, a positioning frequency according to the expected journey L and the speed value v of the mobile terminal includes adjusting, by the mobile terminal, the positioning frequency according to the expected journey L and the speed value v of the mobile terminal when the speed value v of the mobile terminal is not equal to 0, and the method further includes adjusting, by the mobile terminal, the positioning frequency to 0 when the speed value of the mobile terminal is equal to 0.

With reference to any one of the first aspect to the sixth implementation manner of the first aspect of the embodiments of the present disclosure, in a seventh implementation manner of the first aspect of the embodiments of the present disclosure, before obtaining, by the mobile terminal, a speed value v of the mobile terminal, the method further includes triggering, by the mobile terminal, a positioning operation.

With reference to any one of the first aspect to the seventh implementation manner of the first aspect of the embodiments of the present disclosure, in an eighth implementation manner of the first aspect of the embodiments of the present disclosure, the method further includes adjusting, by the mobile terminal, the positioning frequency to a preset fixed positioning frequency when the mobile terminal cannot obtain the speed value v of the mobile terminal.

A second aspect of the embodiments of the present disclosure provides an apparatus, including a determining module configured to determine an expected journey L, where the expected journey is an expected value of a distance traveled by the apparatus between two consecutive times of positioning, an obtaining module configured to obtain a speed value v of the apparatus, an adjustment module configured to adjust a positioning frequency according to the expected journey L determined by the determining module and the speed value v that is of the apparatus and obtained by the obtaining module such that a deviation of a distance traveled by the apparatus between two consecutive times of positioning performed by a positioning module according to an adjusted positioning frequency from the expected journey L is less than a specified threshold, and the positioning module configured to perform positioning according to the positioning frequency adjusted by the adjustment module.

With reference to the second aspect of the embodiments of the present disclosure, in a first implementation manner of the second aspect of the embodiments of the present disclosure, the adjustment module is configured to obtain a second positioning time t according to the expected journey L and the speed value v of the apparatus when a first positioning operation is triggered, and the positioning module is configured to trigger a second positioning operation at the second positioning time t.

With reference to the first implementation manner of the second aspect of the embodiments of the present disclosure, in a second implementation manner of the second aspect of the embodiments of the present disclosure, the adjustment module further includes a first obtaining unit configured to obtain a time interval T according to the formula $T=L/v$, that is, the time interval T is equal to a ratio of the expected journey L to the speed value v of the apparatus, and a determining unit configured to determine the second positioning time t as a sum value of a current moment determined by the apparatus and the time interval T.

With reference to the first implementation manner of the second aspect of the embodiments of the present disclosure, in a third implementation manner of the second aspect of the embodiments of the present disclosure, the adjustment module further includes a second obtaining unit configured to obtain a traveled distance L' of the apparatus by performing integration on the speed value v of the apparatus in terms of time starting from a time point at which the first positioning operation is triggered, and an adjustment unit configured to adjust the positioning frequency according to the traveled distance L' and the expected journey L such that the deviation of the distance traveled by the apparatus between the two consecutive times of positioning performed by the positioning module according to the adjusted positioning frequency from the expected journey L is less than the specified threshold.

With reference to any one of the second aspect to the third implementation manner of the second aspect of the embodiments of the present disclosure, in a fourth implementation manner of the second aspect of the embodiments of the present disclosure, the determining module includes an obtaining unit configured to obtain a positioning error R and lengths of closed paths that surround all unreachable regions in a positioning scenario, a first determining unit configured to determine a value range of the expected journey L as $2R<L<(C/2)$ when a minimum closed path length C is greater than 4R, a second determining unit configured to determine a value range of the expected journey L as $2R<L<(C_1/2)$ when a minimum closed path length C is not greater than 4R, where $C_1$ is a minimum closed path length greater than 4R, and a receiving unit configured to receive an expected journey L selected by a user from the value range of the expected journey L.

With reference to any one of the second aspect to the third implementation manner of the second aspect of the embodiments of the present disclosure, in a fifth implementation manner of the second aspect of the embodiments of the present disclosure, the determining module includes a third determining unit configured to determine a current positioning scenario, and a fourth determining unit configured to determine, according to a preset correspondence between a positioning scenario and an expected journey, the expected journey L corresponding to the current positioning scenario.

With reference to any one of the second aspect to the fifth implementation manner of the second aspect of the embodiments of the present disclosure, in a sixth implementation manner of the second aspect of the embodiments of the present disclosure, the adjustment module is configured to adjust the positioning frequency according to the expected journey L determined by the determining module and the speed value v that is of the apparatus and obtained by the obtaining module such that the deviation of the distance traveled by the apparatus between the two consecutive times of positioning performed by the positioning module according to the adjusted positioning frequency from the expected journey L is less than the specified threshold when the speed value v of the apparatus is not equal to 0, and the adjustment module is further configured to adjust the positioning frequency to 0 when the speed value of the mobile terminal is equal to 0.

With reference to any one of the second aspect to the sixth implementation manner of the second aspect of the embodiments of the present disclosure, in a seventh implementation manner of the second aspect of the embodiments of the present disclosure, the apparatus further includes an enabling module configured to trigger a positioning operation.

With reference to any one of the second aspect to the seventh implementation manner of the second aspect of the embodiments of the present disclosure, in an eighth implementation manner of the second aspect of the embodiments of the present disclosure, the adjustment module is further configured to adjust the positioning frequency to a fixed positioning frequency when the speed value v of the apparatus cannot be obtained.

A third aspect of the embodiments of the present disclosure provides a mobile terminal, including a memory, a processor, an input apparatus, and an output apparatus, where the memory is connected to the processor, the processor is connected to the input apparatus, and the processor is connected to the output apparatus, and by invoking an operation instruction stored in the memory, the processor is configured to perform the steps of determining an expected journey L, where the expected journey is an expected value of a distance traveled by the mobile terminal between two consecutive times of positioning, obtaining a speed value v of the mobile terminal, adjusting a positioning frequency according to the expected journey L and the speed value v of the mobile terminal such that a deviation of a distance traveled by the mobile terminal between two consecutive times of positioning performed by the mobile terminal according to an adjusted positioning frequency from the expected journey L is less than a specified threshold, and performing positioning according to the adjusted positioning frequency.

With reference to the third aspect of the embodiments of the present disclosure, in a first implementation manner of the third aspect of the embodiments of the present disclosure, when performing the step of adjusting a positioning frequency according to the expected journey L and the speed value v of the mobile terminal, the processor further performs the step of obtaining a second positioning time t of the mobile terminal according to the expected journey L and the speed value v of the mobile terminal when triggering a first positioning operation, and the processor further performs the step of triggering a second positioning operation at the second positioning time t when performing the step of performing positioning according to the adjusted positioning frequency.

With reference to the first implementation manner of the third aspect of the embodiments of the present disclosure, in a second implementation manner of the third aspect of the embodiments of the present disclosure, when performing the step of obtaining a second positioning time t of the mobile terminal according to the expected journey L and the speed value v of the mobile terminal, the processor further performs the steps of obtaining a time interval T according to the following formula $T=L/v$, that is, the time interval T is equal to a ratio of the expected journey L to the speed value v of the mobile terminal, and determining the second positioning time t of the mobile terminal as a sum value of a current moment determined by the mobile terminal and the time interval T.

With reference to the first implementation manner of the third aspect of the embodiments of the present disclosure, in a third implementation manner of the third aspect of the embodiments of the present disclosure, when performing the step of adjusting a positioning frequency according to the expected journey L and the speed value v of the mobile terminal, the processor further performs the step of obtaining a traveled distance L' of the mobile terminal by performing integration on the speed value v of the mobile terminal in terms of time starting from a time point at which a first positioning operation is triggered, and adjusting the positioning frequency according to the traveled distance L' and the expected journey L.

With reference to any one of the third aspect to the third implementation manner of the third aspect of the embodiments of the present disclosure, in a fourth implementation manner of the third aspect of the embodiments of the present disclosure, when performing the step of determining an expected journey L, the processor further performs the steps of obtaining a positioning error R and lengths of closed paths that surround all unreachable regions in a positioning scenario, determining a value range of the expected journey L as $2R<L<(C/2)$ when a minimum closed path length C is greater than 4R, or determining a value range of the expected journey L as $2R<L<(C_1/2)$ when a minimum closed path length C is not greater than 4R, where $C_1$ is a minimum closed path length greater than 4R, and receiving an expected journey L selected by a user from the value range of the expected journey L.

With reference to any one of the third aspect to the third implementation manner of the third aspect of the embodiments of the present disclosure, in a fifth implementation manner of the third aspect of the embodiments of the present disclosure, when performing the step of determining an expected journey L, the processor further performs the steps of determining a current positioning scenario, and determining, according to a preset correspondence between a positioning scenario and an expected journey, the expected journey L corresponding to the current positioning scenario.

With reference to any one of the third aspect to the fifth implementation manner of the third aspect of the embodiments of the present disclosure, in a sixth implementation manner of the third aspect of the embodiments of the present disclosure, when performing the step of adjusting a positioning frequency according to the expected journey L and the speed value v of the mobile terminal, the processor further performs the step of adjusting, by the mobile terminal, the positioning frequency according to the expected journey L and the speed value v of the mobile terminal when the speed value v of the mobile terminal is not equal to 0, or adjusting the positioning frequency to 0 when the speed value of the mobile terminal is equal to 0.

With reference to any one of the third aspect to the sixth implementation manner of the third aspect of the embodiments of the present disclosure, in a seventh implementation manner of the third aspect of the embodiments of the present disclosure, before performing the step of obtaining a speed value v of the mobile terminal, the processor is further configured to perform the step of triggering a positioning operation.

With reference to any one of the third aspect to the seventh implementation manner of the third aspect of the embodiments of the present disclosure, in an eighth implementation manner of the third aspect of the embodiments of the present disclosure, the processor is further configured to perform the step of adjusting the positioning frequency to a preset fixed positioning frequency when the speed value v of the mobile terminal cannot be obtained.

It can be learned from the foregoing technical solutions that the embodiments of the present disclosure have the following advantages. In the embodiments of the present disclosure, a mobile terminal first determines an expected journey L, where the expected journey is an expected value of a distance traveled by the mobile terminal between two consecutive times of positioning, then obtains a speed value v of the mobile terminal; afterwards, adjusts a positioning frequency according to the expected journey L and the speed value v of the mobile terminal such that a deviation of a distance traveled by the mobile terminal between two consecutive times of positioning performed according to an adjusted positioning frequency from the expected journey L is less than a specified threshold, and performs positioning according to the adjusted positioning frequency. In this way, an average length of positioning tracks between two consecutive times of positioning differs little from the expected journey L, track fitting precision is improved, and erroneous track determining is eliminated. FIGS. 2A, 2B, 2C and 2D show distribution situations of positioning position points when different values d1, d2, d3, and d4 are assigned to the expected journey L. Because distribution intervals between the positioning position points are basically even and controllable, a traveling track of a target can be accurately estimated during fast movement in a complex scenario by assigning a proper value to the expected journey L, which reduces a probability of erroneously determining the traveling track because of the complex scenario or an excessively fast movement speed.

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person skilled in the art based on the embodiments of the present disclosure without creative efforts shall fall within the protection scope of the present disclosure.

Figure 1:
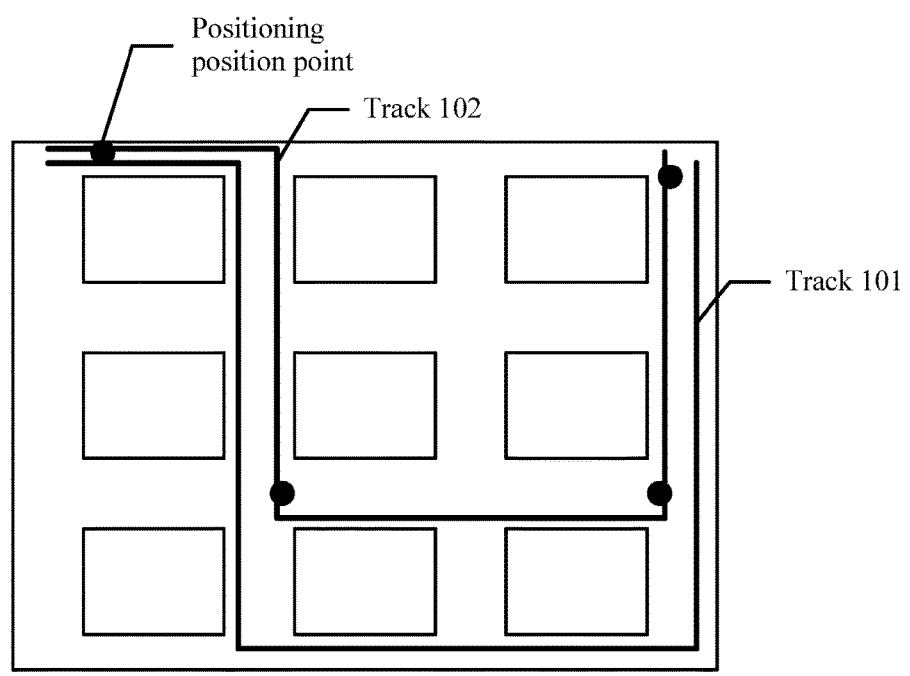
FIG. 1 is a schematic diagram of a positioning track presentation effect according to an embodiment of the present disclosure.
Figure 2A:
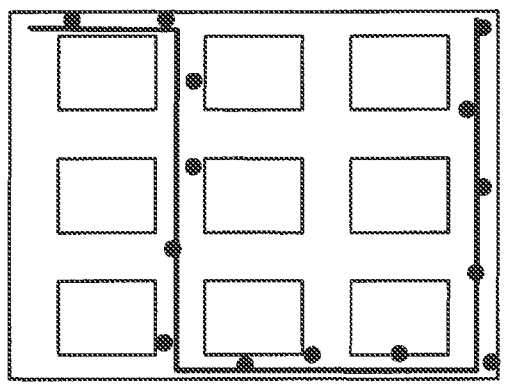
FIGS. 2A, 2B, 2C and 2D show schematic diagrams of positioning track presentation effects according to an embodiment of the present disclosure.
Figure 2B:
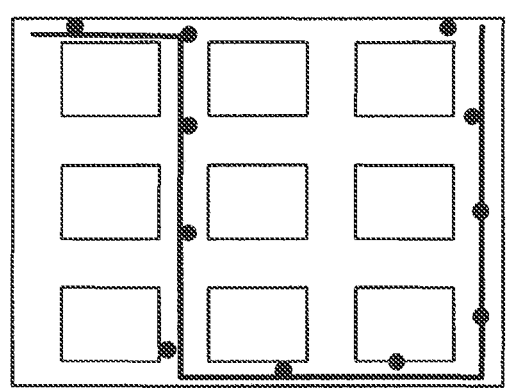
Figure 2C:
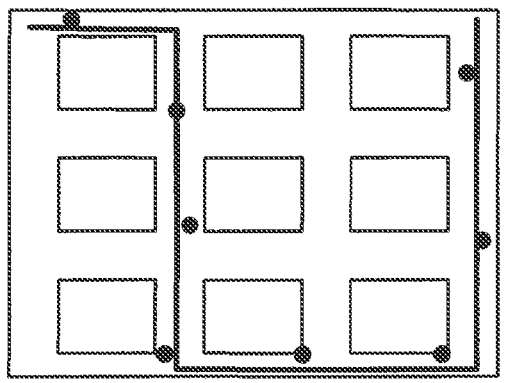
Figure 2D:
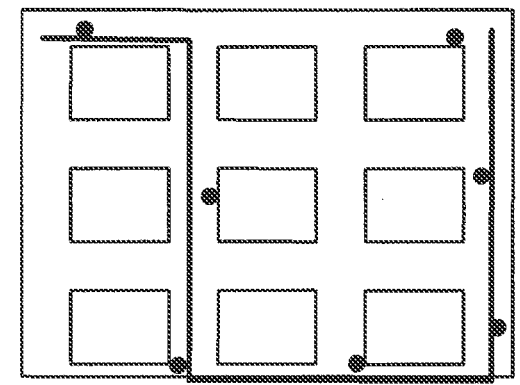
Figure 3:
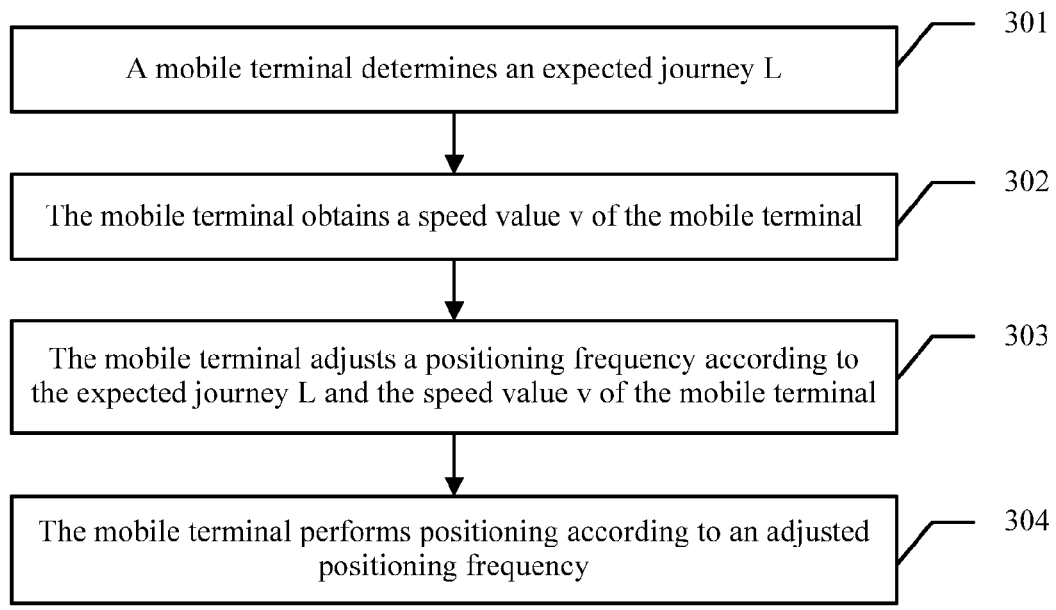
FIG. 3 is a schematic flowchart of a positioning method according to an embodiment of the present disclosure.

Referring to FIG. 3, an embodiment of a positioning method in the embodiments of the present disclosure includes the following steps.

Step 301: A mobile terminal determines an expected journey L.

The mobile terminal determines the expected journey L, where the expected journey L is an expected value of a distance traveled by the mobile terminal between two consecutive times of positioning.

It may be understood that the mobile terminal has many opportunities to determine the expected journey L. For example, the mobile terminal may determine the expected journey L when the mobile terminal is powered on or when the mobile terminal is ready to start positioning, which is not limited herein.

Step 302: The mobile terminal obtains a speed value v of the mobile terminal.

The mobile terminal may continuously monitor the speed value of the mobile terminal, and the mobile terminal obtains the speed value v of the mobile terminal when the speed value of the mobile terminal needs to be used in another operation.

Step 303: The mobile terminal adjusts a positioning frequency according to the expected journey L and the speed value v of the mobile terminal.

After determining the expected journey and obtaining the speed value v of the mobile terminal, the mobile terminal adjusts the positioning frequency according to the expected journey L and the speed value v of the mobile terminal such that a deviation of a distance traveled by the mobile terminal between two consecutive times of positioning performed by the mobile terminal according to an adjusted positioning frequency from the expected journey L is less than a specified threshold.

It should be noted that the positioning frequency is a concept representing times of positioning performed within a specific time, but because a reciprocal of a frequency is a time, in actual application, the positioning frequency may be used to reflect a time interval between every two times of positioning. However, to keep the deviation of the distance traveled by the mobile terminal between the two consecutive times of positioning from the expected journey L less than the specified threshold, the time interval or the positioning frequency needs to be adjusted after each time of positioning. A specific opportunity for adjusting the positioning frequency to determine a next positioning time depends on a specific adjustment manner. In different adjustment manners, opportunities for adjusting the positioning frequency to determine a positioning time are different. For example, in some manners, when a first time of positioning is being performed, the positioning frequency may be adjusted to determine a positioning opportunity of a second time of positioning. However, in some manners, the positioning frequency needs to be adjusted in a time period between a first time of positioning and a second time of positioning, and an opportunity of the second time of positioning cannot be accurately determined until the second time of positioning is to be performed. There may further be another method, which is not limited herein.

The specified threshold may be preset according to an application scenario of the mobile terminal, or may be preset by a manufacturer before delivery, or may be customized by a user each time before positioning, which is not limited herein.

It may be understood that the specified threshold is a deviation value of an actual distance traveled by the mobile terminal from the expected journey L of the mobile terminal, and therefore the specified threshold needs to be far less than the expected journey L.

Step 304: The mobile terminal performs positioning according to the adjusted positioning frequency.

After adjusting the positioning frequency, the mobile terminal performs positioning according to the adjusted positioning frequency. A distance traveled by the mobile terminal between every two consecutive times of positioning is close to the expected journey L.

In this embodiment of the present disclosure, a mobile terminal first determines an expected journey L, where the expected journey is an expected value of a distance traveled by the mobile terminal between two consecutive times of positioning. Then obtains a speed value v of the mobile terminal. Afterwards, adjusts a positioning frequency according to the expected journey L and the speed value v of the mobile terminal such that a deviation of a distance traveled by the mobile terminal between two consecutive times of positioning performed according to an adjusted positioning frequency from the expected journey L is less than a specified threshold, and performs positioning according to the adjusted positioning frequency. In this way, an average length of positioning tracks between two consecutive times of positioning differs little from the expected journey L, track fitting precision is improved, and erroneous track determining is eliminated. FIGS. 2A, 2B, 2C and 2D show distribution situations of positioning position points when different values d1, d2, d3, and d4 are assigned to the expected journey L. Because distribution intervals between the positioning position points are basically even and controllable, a traveling track of a target can be accurately estimated during fast movement in a complex scenario by assigning a proper value to the expected journey L, which reduces a probability of erroneously determining the traveling track because of the complex scenario or an excessively fast movement speed.

Figure 4:
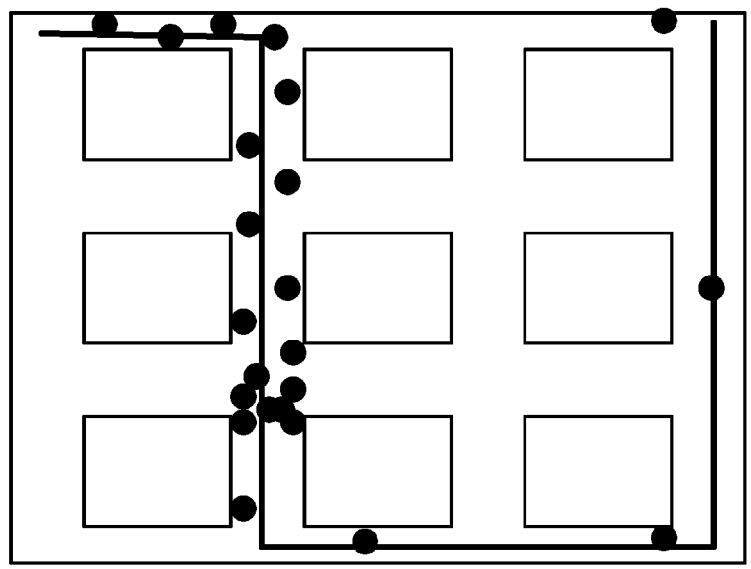
FIG. 4 is a schematic diagram of another positioning track presentation effect according to an embodiment of the present disclosure.
Figure 5:
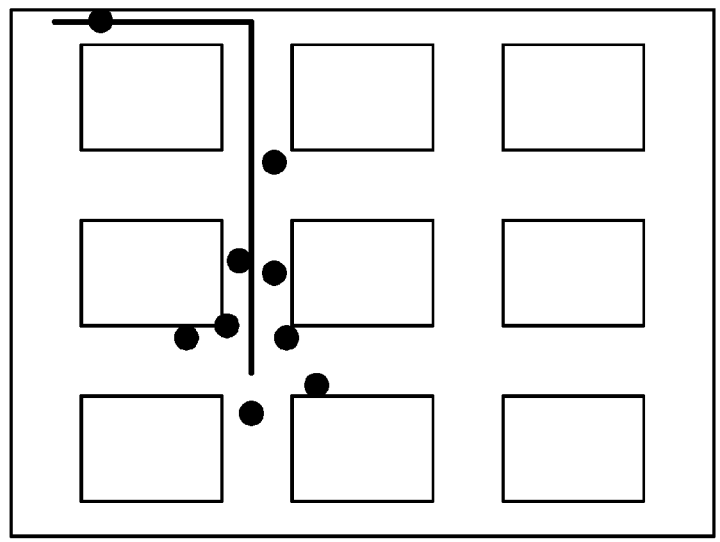
FIG. 5 is a schematic diagram of another positioning track presentation effect according to an embodiment of the present disclosure.

Further, because of a change of a traveling speed of a target, positioning performed on a fixed frequency in other approaches may cause unevenly scattered positioning positions, which affects a positioning presentation effect and user experience. When the traveling speed of the target is relatively slow, the positioning positions mix and overlap because of a positioning error, which makes a user sensually confused. A positioning position mixing and overlapping phenomenon shown in FIG. 4 is caused when the terminal slows down after moving a distance, and an uneven positioning effect shown in FIG. 5 is caused when a speed of the mobile terminal suddenly becomes fast.

Figure 6:
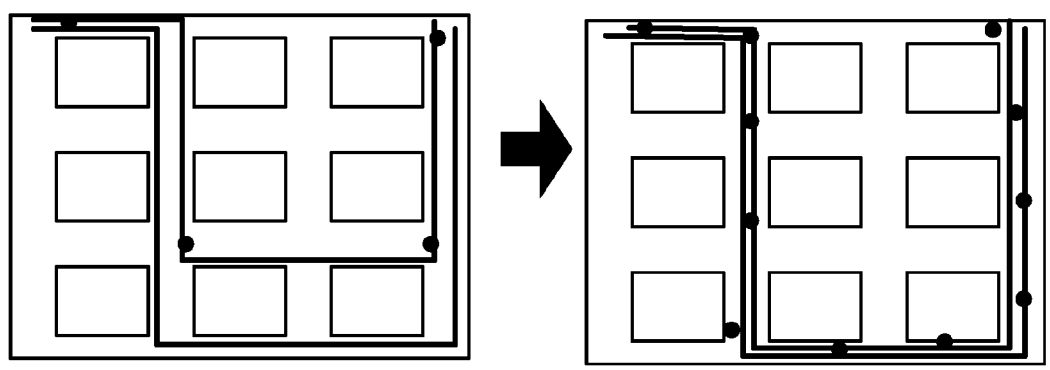
FIG. 6 is a schematic diagram of another positioning track presentation effect according to an embodiment of the present disclosure.

However, using the positioning method in the embodiments of the present disclosure, a positioning presentation effect is improved. As shown in FIG. 6, the positioning position points of the mobile terminal are basically distributed at a distance interval close to that expected by the user. In addition, distribution is more even, and a change of a movement speed of the terminal has little impact on a distribution effect. For all positioning applications in various movement forms, a positioning presentation effect can be improved. In addition, an adaptive positioning frequency can be automatically set. A suitable positioning frequency can be automatically obtained by means of calculation according to the expected journey L set by the user and the speed v of the mobile terminal in order to ensure that an average length of positioning tracks between two consecutive times of positioning differs little from the expected journey L.

In the foregoing embodiment, the mobile terminal adjusts the positioning frequency according to the expected journey L and the speed value v of the mobile terminal. In actual application, if the deviation of the distance traveled by the mobile terminal between the two consecutive times of positioning from the expected journey L is less than the specified threshold, there are many specific implementation manners for adjusting the positioning frequency. The following separately uses two of the specific implementation manners as examples for description.

Figure 7:
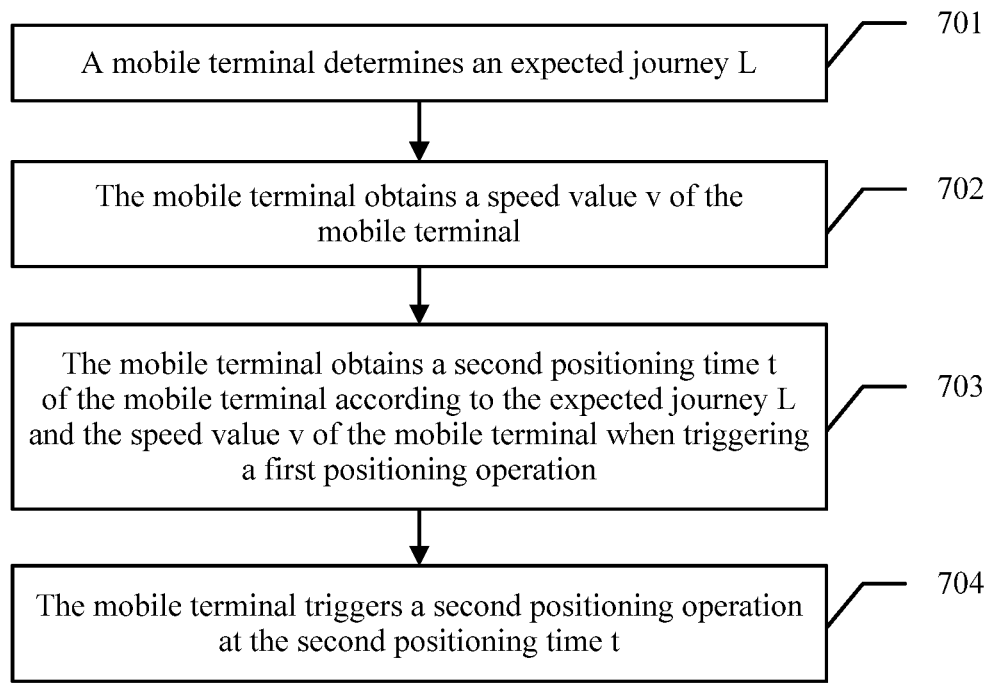
FIG. 7 is another schematic flowchart of a positioning method according to an embodiment of the present disclosure.

Manner I: A next positioning time t is directly obtained by means of calculation according to the expected journey L and the speed value v of the mobile terminal. Referring to FIG. 7, another embodiment of the positioning method in the embodiments of the present disclosure includes the following steps.

Step 701: A mobile terminal determines an expected journey L.

The mobile terminal determines the expected journey L, where the expected journey L is an expected value of a distance traveled by the mobile terminal between two consecutive times of positioning.

It may be understood that the mobile terminal has many opportunities to determine the expected journey L. For example, the mobile terminal may determine the expected journey L when the mobile terminal is powered on or when the mobile terminal is ready to start positioning, which is not limited herein.

Step 702: The mobile terminal obtains a speed value v of the mobile terminal.

The mobile terminal may continuously monitor the speed value of the mobile terminal, and the mobile terminal obtains the speed value v of the mobile terminal when the speed value of the mobile terminal needs to be used in another operation.

Step 703: The mobile terminal obtains a second positioning time t of the mobile terminal according to the expected journey L and the speed value v of the mobile terminal when triggering a first positioning operation.

After starting positioning, the mobile terminal obtains the second positioning time t of the mobile terminal according to the expected journey L and the speed value v of the mobile terminal when triggering the first positioning operation.

It may be understood that the moment when the second positioning time t is obtained, a positioning frequency between a first time of positioning and a second time of positioning is determined, and a second positioning operation is triggered at the second positioning time t such that a deviation of a distance traveled by the mobile terminal between the first positioning operation and the second positioning operation from the expected journey L can be less than a specified threshold.

It should be noted that the terms "first" and "second" are not intended to limit an absolute time sequence of the two positioning operations in a positioning process of the mobile terminal, that is, the first positioning operation does not indicate that the first positioning operation is an initial positioning operation performed by the mobile terminal after the mobile terminal starts positioning, but is merely used to indicate a relative time sequence of the first positioning operation and the second positioning operation. The first positioning operation may be any positioning operation performed by the mobile terminal after the mobile terminal starts positioning, and the second positioning operation is a next positioning operation that is after the first positioning operation and adjacent to the first positioning operation.

There may be multiple specific operations of obtaining the second positioning time t of the mobile terminal according to the expected journey L and the speed value v of the mobile terminal.

Optionally, the second positioning time t may be obtained by means of calculation using the following steps.

Step 1: The mobile terminal obtains a time interval T according to the formula $T=L/v$, that is, the time interval T is equal to a ratio of the expected journey L to the speed value v of the mobile terminal.

The time interval T actually represents a time interval between two consecutive times of positioning.

Step 2: The mobile terminal determines the second positioning time t as a sum value of a current moment of the mobile terminal and the time interval T.

It may be understood that to adjust the positioning frequency in this manner, a current speed value v of the mobile terminal is obtained during each time of positioning, that is, the current moment is a moment at which a positioning operation is performed, and is also a moment at which the speed value v of the mobile terminal is obtained. The speed value v of the mobile terminal is obtained, with the purpose of obtaining a next positioning time by means of calculation.

When the first positioning operation is being performed at the current moment, the speed value v of the mobile terminal is obtained at the current moment, the time interval T for the second time of positioning is obtained by means of calculation according to the formula $T=L/v$, and the second positioning time t is obtained by adding the time interval T to the current moment. If the time interval T is relatively short, v changes little in the time T, and then a distance S traveled by the mobile terminal is approximately equal to $v*T=L$ between the two times of positioning, that is, between the first time of positioning and the second time of positioning. When the second positioning operation is performed at the time t, another speed value of the mobile terminal is obtained, and another time interval is obtained by means of calculation according to the expected journey L and the speed value v of the mobile terminal to obtain a next positioning time. Therefore, a purpose of adjusting the positioning frequency to ensure that the deviation of the distance traveled by the mobile terminal between the two consecutive times of positioning from the expected journey L is less than the specified threshold is achieved.

Optionally, when the second positioning time t is calculated using the foregoing steps, considering a delay in obtaining the speed value v or a possible change situation of the speed value v of the mobile terminal between the two times of positioning, deviation adjustment may be performed on the second positioning time t obtained by means of calculation. For example, a deviation time may be subtracted from the obtained second positioning time t, or the obtained second positioning time t is multiplied by a weighted value, which is not limited herein.

Step 704. The mobile terminal triggers a second positioning operation at the second positioning time t.

After obtaining the second positioning time t, the mobile terminal triggers the second positioning operation at the second positioning time t. It can be learned from the foregoing analysis that triggering the second positioning operation at the second positioning time t can ensure that a distance traveled by the mobile terminal between every two consecutive times of positioning is close to the expected journey L.

Optionally, in actual application, there are many specific implementation manners for triggering the second positioning operation at the second positioning time t. It is not necessarily required to obtain a next positioning time by adding the time interval T obtained by means of calculation to a current moment, and then perform positioning after the next positioning time t arrives. For example, a timer with a time T is directly started after the time interval T is obtained by means of calculation, and the second positioning operation is triggered when the time T of the timer arrives. This manner may also be included in the triggering the second positioning operation at the second positioning time t. There may further be many other specific implementation manners, which are not limited herein.

Optionally, after obtaining the time interval T by means of calculation, the mobile terminal may first determine whether the time interval T is greater than a minimum time interval. The minimum time interval is used as the time interval between the first time of positioning and the second time of positioning if the time interval T is less than the minimum time interval, or the time interval T is used as the time interval between the first time of positioning and the second time of positioning if the time interval T is greater than the minimum time interval. In this way, an excessively high positioning frequency caused by an excessively fast speed of the mobile terminal can be avoided.

In this embodiment of the present disclosure, a mobile terminal obtains a second positioning time t by means of calculation according to an expected journey L and a speed value v of the mobile terminal, and triggers a second positioning operation at the second positioning time t such that a deviation of a distance traveled by the mobile terminal between two consecutive times of positioning from the expected journey L is less than a specified threshold. A speed value v that is of the mobile terminal and obtained during each time of positioning is different such that a frequency for each time of positioning correspondingly changes, and a purpose of making the distance traveled by the mobile terminal between the two times of positioning differ little from the expected journey L can be achieved only with an extremely small calculation amount.

Figure 8:
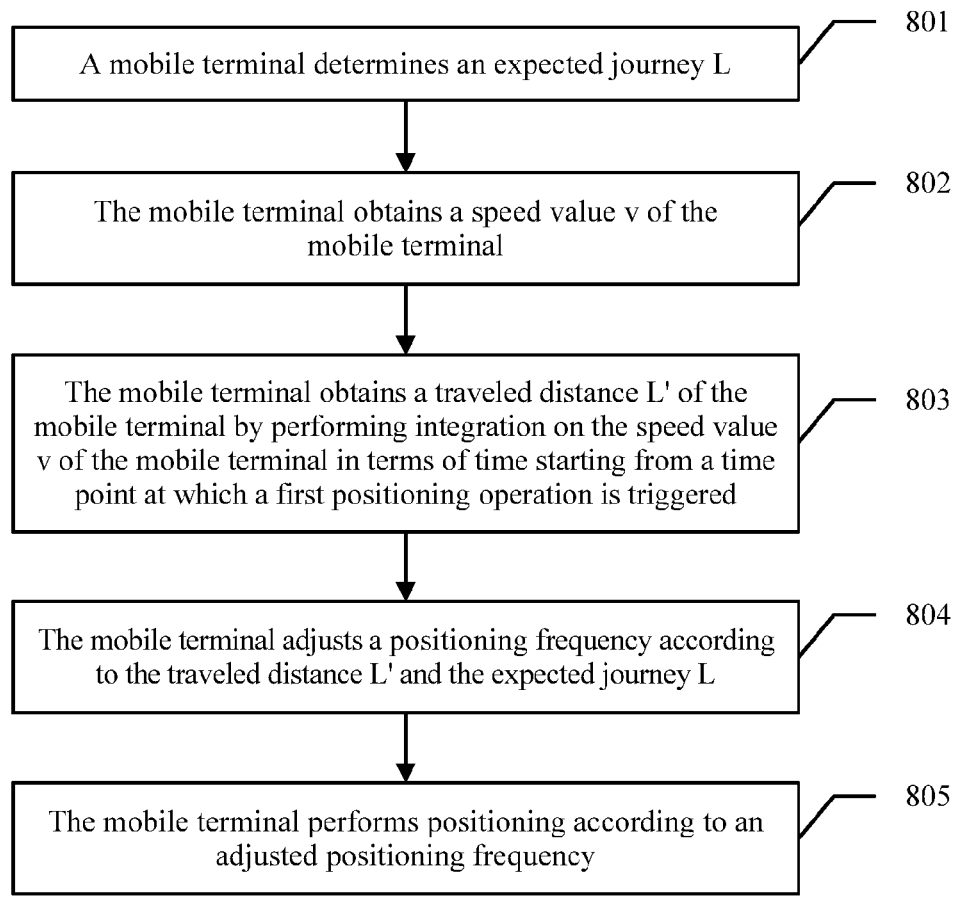
FIG. 8 is another schematic flowchart of a positioning method according to an embodiment of the present disclosure.

Manner II: A traveled distance L' of the mobile terminal is obtained according to the speed value v of the mobile terminal, and the positioning frequency is adjusted according to the traveled distance L' and the expected journey L. Referring to FIG. 8, another embodiment of the positioning method in the embodiments includes the following steps.

Step 801: A mobile terminal determines an expected journey L.

The mobile terminal determines the expected journey L, where the expected journey L is an expected value of a distance traveled by the mobile terminal between two consecutive times of positioning.

It may be understood that the mobile terminal has many opportunities to determine the expected journey L. For example, the mobile terminal may determine the expected journey L when the mobile terminal is powered on or when the mobile terminal is ready to start positioning, which is not limited herein.

Step 802: The mobile terminal obtains a speed value v of the mobile terminal.

The mobile terminal may continuously monitor the speed value of the mobile terminal, and the mobile terminal obtains the speed value v of the mobile terminal when the speed value of the mobile terminal needs to be used in another operation.

Step 803: The mobile terminal obtains a traveled distance L' of the mobile terminal by performing integration on the speed value v of the mobile terminal in terms of time starting from a time point at which a first positioning operation is triggered.

After starting positioning, the mobile terminal obtains the traveled distance L' of the mobile terminal by performing integration on the speed value v of the mobile terminal in terms of time starting from the time point at which the first positioning operation is triggered.

Because an integral of a speed (a continuously changed speed) over a time period is a distance traveled in this time period, the distance L' traveled by the mobile terminal starting from the time point at which the first positioning operation is triggered can be obtained by performing integration on the speed value v of the mobile terminal in terms of time starting from the time point at which the first positioning operation is triggered.

A specific process in which the mobile terminal obtains the traveled distance L' of the mobile terminal by performing integration on the speed value v of the mobile terminal in terms of time may be as follows.

Figure 9A:
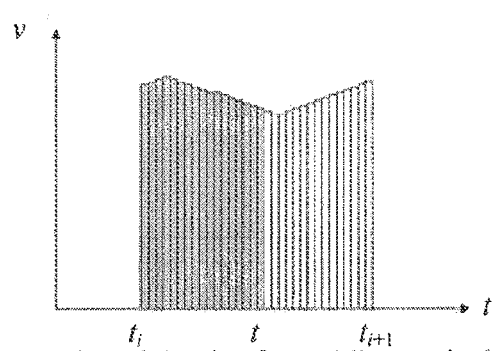
FIGS. 9A and 9B are schematic diagrams of operation process of a traveled distance.
Figure 9B:
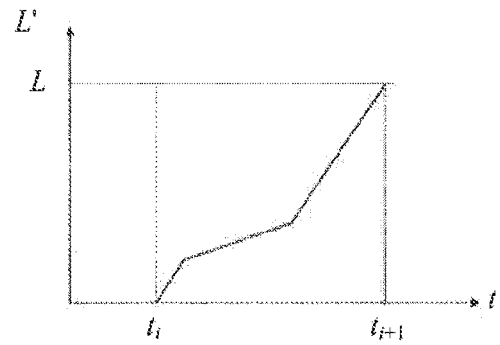

Assuming that an $i^{th}$ positioning time is $t_i$, and the mobile terminal obtains a speed value on a high frequency, for example, obtains one instantaneous speed v every other small time period dt, the following accumulative operation is performed starting from the time $t_i$ for the traveled distance L' of the mobile terminal:

$$L' = \sum_{j=1}^{n} v_j dt,$$

where $v_j$ represents an instantaneous speed obtained at a $j^{th}$ time starting from the moment $t_i$. An operation process of the traveled distance shown in the foregoing formula can be equivalently represented using FIGS. 9A and 9B. FIG. 9A shows a speed that is of the mobile terminal and obtained between two consecutive times of positioning, where a horizontal coordinate of each vertical line represents a time at which a speed is obtained, a height of a vertical line represents a speed value, a distance between two adjacent vertical lines represents a time interval dt for obtaining a speed, and an area of a vertical bar including two adjacent vertical lines represents an estimated value of a distance traveled by the mobile terminal in the time dt. Therefore, from the moment $t_i$ to any time t, an area surrounded by vertical lines corresponding to the moment $t_i$ and the moment t, a time coordinate axis, and a speed envelope line is an estimated value of a distance traveled by the mobile terminal from the moment $t_i$ to the moment t. The area corresponds to a value of a traveled distance curve at the moment t in FIG. 9B. With continuous accumulation of the traveled distance, until a difference between L' and the expected journey L is less than the specified threshold at a moment $t_{i+1}$, it is determined that a next time of positioning is performed at the moment $t_{i+1}$, and a positioning operation is triggered.

It may be understood that although the foregoing operation process is a manner used in actual engineering for dividing a time into small segments to separately obtain distances by means of calculation and then performing accumulation, but instead of a purely valued integral operation, an idea of integration is applied. Therefore, both a purely valued integral operation manner and a manner using the idea of integration to divide a time period into multiple small segments and then perform accumulation are regarded as the manner for performing integration on the speed value v of the mobile terminal in terms of time.

It may be understood that when adjusting the positioning frequency using the method in this embodiment, the mobile terminal may continuously obtain the speed value v of the mobile terminal on an extremely high frequency, and then obtain the traveled distance L' of the mobile terminal by performing integration on the speed value v of the mobile terminal in terms of time.

It may be understood that after the traveled distance L' of the mobile terminal is obtained by means of integration, considering an obtaining delay, an error, or the like, some deviation operations may further be performed on the traveled distance L' before the traveled distance L' is compared with the expected journey L, which is not limited herein.

Step 804: The mobile terminal adjusts a positioning frequency according to the traveled distance L' and the expected journey L.

After obtaining the traveled distance L', the mobile terminal adjusts the positioning frequency according to the traveled distance L' and the expected journey L such that a deviation of a distance traveled by the mobile terminal between two consecutive times of positioning performed by the mobile terminal according to an adjusted positioning frequency from the expected journey L is less than the specified threshold.

It may be understood that in step 803, obtaining the traveled distance L' of the mobile terminal by performing integration on the speed value v of the mobile terminal in terms of time is a continuous process from triggering the first positioning operation to triggering the second positioning operation. The traveled distance L' continuously increases with time. Therefore, in step 804, adjusting the positioning frequency is also a continuous process, which lasts until triggering of the second positioning operation is determined. However, a condition for determining triggering of the second positioning operation is that the traveled distance L' and the expected journey L are less than the specified threshold.

A result of adjusting the positioning frequency is as follows. When the traveled distance L' and the expected journey L are less than the specified threshold, the mobile terminal triggers the second positioning operation, and then the mobile terminal obtains, by performing integration on the speed value v of the mobile terminal in terms of time starting from a time point at which the second positioning operation is triggered, another distance L' traveled by the mobile terminal between the second positioning operation and a third positioning operation, and so on.

The specified threshold may be preset according to an application scenario of the mobile terminal, or may be preset by a manufacturer before delivery, or may be customized by a user each time before positioning, which is not limited herein.

It may be understood that the specified threshold is a deviation value of an actual distance traveled by the mobile terminal from the expected journey L of the mobile terminal, and therefore the specified threshold needs to be far less than the expected journey L.

Step 805: The mobile terminal performs positioning according to the adjusted positioning frequency.

After adjusting the positioning frequency, the mobile terminal performs positioning according to the adjusted positioning frequency. A distance traveled by the mobile terminal between every two consecutive times of positioning is close to the expected journey L.

In step 804, the moment when the mobile terminal adjusts the positioning frequency, an opportunity for triggering the second positioning operation is determined. The mobile terminal triggers a positioning operation in step 805 when the mobile terminal determines to trigger the second positioning operation in step 804.

In the foregoing embodiment, the mobile terminal obtains the traveled distance L' by means of integration, and adjusts the positioning frequency according to the traveled distance L' and the expected journey L such that the obtained traveled distance of the mobile terminal is more accurate, and a condition that the deviation of the distance traveled by the mobile terminal between the two consecutive times of positioning from the expected journey L is less than the specified threshold can be more accurately met.

The foregoing describes that the mobile terminal may adjust the positioning frequency in different manners such that the deviation of the distance traveled by the mobile terminal between the two consecutive times of positioning from the expected journey L is less than the specified threshold. Further, in actual application, the mobile terminal may also determine the expected journey in multiple manners. The following describes in detail the step in which the mobile terminal determines the expected journey L.

It may be understood that the expected journey L determined by the mobile terminal in each of different positioning scenarios may be manually set by a user, or may be automatically selected by the mobile terminal according to the positioning scenario.

Manner I: Manual Setting.

To ensure that the specified expected journey L meets a final displayed positioning effect, a movement track is not erroneously determined, positioning points do not mix and overlap, and the like, if manually setting is used, the mobile terminal may give a value range of different expected journeys according to different positioning scenarios such that the user selects the expected journey L from the value range.

In another embodiment of the positioning method in the embodiments of the present disclosure, specific steps of determining the expected journey L may be as follows.

Step 1: The mobile terminal obtains a positioning error R and lengths of closed paths that surround all unreachable regions in a positioning scenario.

Figure 10:
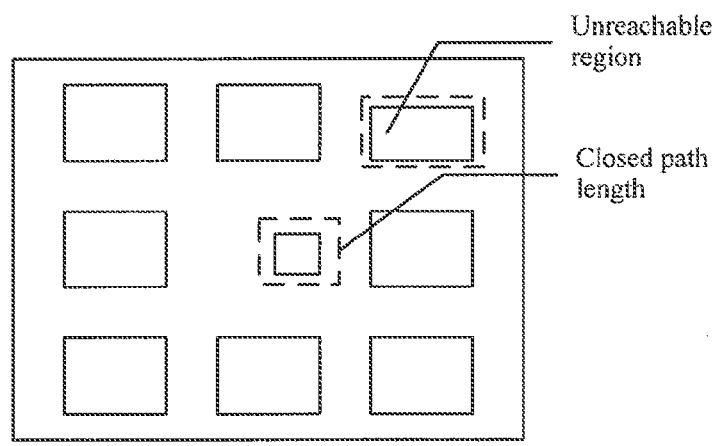
FIG. 10 is a schematic diagram of an instance of an unreachable region according to an embodiment of the present disclosure.
Figure 11:
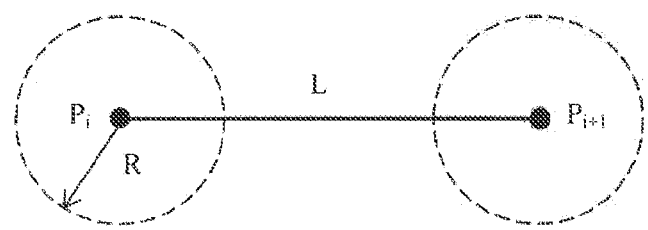
FIG. 11 is a schematic effect diagram of a positioning error according to an embodiment of the present disclosure.

It may be understood that in a positioning scenario, there may be many different closed path lengths according to sizes of unreachable regions. The positioning scenario includes a region in a specific range nearby a position of the mobile terminal during positioning. For example, the positioning scenario may be determined as a warehouse if the mobile terminal performs positioning in the warehouse, and the positioning scenario may be determined as a factory if the mobile terminal performs positioning in the factory. For another example, the positioning scenario may be determined as a city or a region including a road and a specific range around the road if positioning is performed on the road in the city. The mobile terminal may obtain a specific situation in a positioning scenario from an electronic map corresponding to the positioning scenario. The unreachable region is an unreachable enclosed region in the positioning scenario. For example, from one place of a city to another place of the city, and when the positioning scenario is the city, some enclosed buildings between the one place and the other place are unreachable regions, and a destination can be reached only by bypassing these unreachable regions instead of directly passing through these unreachable regions. There may be many sizes of unreachable regions in one positioning scenario. For example, the enclosed buildings cover different areas. A length of a path that surrounds an unreachable region is a closed path length corresponding to the unreachable region, and is approximately a perimeter of the unreachable region. FIG. 10 shows an example of an unreachable region and a closed path length. An unreachable region is surrounded by a solid line box, and a dashed line box that surrounds the solid line box represents a closed path length of the unreachable region. It can be seen that closed path lengths corresponding to unreachable regions are different according to different sizes of the unreachable regions. After obtaining the positioning scenario, the mobile terminal may obtain the closed path lengths of all unreachable regions by means of calculation according to a map of the positioning scenario. In addition, the mobile terminal may obtain the positioning error R according to related data of a positioning system. FIG. 11 shows an example of a positioning error. Each positioning error may fall within a range centered at a positioning point with a radius of a positioning error R.

After obtaining the closed path lengths and the positioning error R, the mobile terminal may determine a range of different expected journeys according to different relationships between the closed path lengths and the positioning error R.

It may be understood that a positioning error may be caused between any two consecutive times of positioning, and therefore a mixing and overlapping phenomenon can be avoided only when the expected journey L is greater than 2R.

When passing by the unreachable region, to clearly determine a movement track of the mobile terminal, the mobile terminal needs to perform one time of positioning while passing by the unreachable region such that which side of the unreachable region the mobile terminal bypasses can be clearly learned. A length of a path bypassing either side of the unreachable region is a half of a closed path length, that is, a track cannot be erroneously determined only when the expected journey L is less than a half of the closed path length. Further, to avoid erroneous determining when the mobile terminal passes by each unreachable region on a map, the expected journey L needs to be less than a half of a minimum closed path length in all the closed path lengths.

Step 2: The mobile terminal determines a value range of the expected journey L as $2R<L<(C/2)$ when a minimum closed path length C is greater than 4R, where C is a minimum closed path length in all the closed path lengths in the positioning scenario.

The mobile terminal determines the value range of the expected journey L as $2R<L<(C/2)$ when the minimum closed path length C in all the closed path lengths is greater than 4R. Assigning a value from this range can not only ensure no mixing and overlapping phenomenon, but also ensure no erroneous track determining in any place on the map.

However, in some scenarios, the minimum closed path C is not greater than 4R. In this case, conditions that L is greater than 2R and L is less than C/2 cannot be met at the same time, and then different value ranges may be selected according to different application scenarios and different positioning track requirements. For example, L may be greater than 2R if there is a higher requirement for no mixing and overlapping, and L may be less than C/2 if there is a higher requirement for no erroneous track determining.

The following is a case of selecting no mixing and overlapping.

Step 3: The mobile terminal determines a value range of the expected journey L as $2R<L<(C_1/2)$ when a minimum closed path length C is not greater than 4R, where C1 is a minimum closed path length greater than 4R.

Because the minimum closed path length C is not greater than 4R, if that L is greater than 2R needs to be ensured, that L is less than C/2 cannot be further ensured, and the minimum path length $C_1$ greater than 4R may be selected from the closed path lengths to determine a value of L as $2R<L<(C_1/2)$. In this way, erroneous track determining may be caused when the mobile terminal passes by an unreachable region whose closed path length is less than $C_1$, but it can be ensured that no mixing and overlapping is caused in an entire positioning process, and it can be ensured that no erroneous track determining is caused when the mobile terminal passes by an unreachable region whose closed path length is greater than C.

In actual application, in some cases, for example, in some dangerous regions, accurate track determining needs to be ensured in spite of location mixing and overlapping. In this case, a range value of the expected journey L can be determined as $L<(C/2)$.

In addition, in some positioning scenarios, there may be no unreachable region, that is, no closed path, and certainly there is no closed path length. In this case, only that the expected journey L is greater than 2R needs to be met.

Step 4: The mobile terminal receives an expected journey L selected by a user from the value range of the expected journey L.

After the mobile terminal determines the value range of the expected journey L, the user may perform selection in the range, and the user may perform random selection in the range, or select a suitable expected journey L according to a preference of the user or according to a current scenario, which is not limited herein.

It may be understood that the value range of the foregoing expected journey L is a value range that can make a better positioning displaying effect considering only no mixing and overlapping and no erroneous track determining. In actual application, the expected journey may be completely specified by the user without being limited by a closed path length of an unreachable region, a positioning error, and the like. However, in this case, avoidance of a phenomenon of positioning position mixing and overlapping or erroneous track determining cannot be ensured.

Manner II: Automatic Selection.

There may also be multiple types of automatic selection. One type may include that the user first sets expected journeys in possible positioning scenarios and then performs matching when determining a positioning scenario. Another type may include that after a positioning scenario is determined, a value range of an expected journey L is determined in the background in the manner in the foregoing manual selection process, and then the mobile terminal randomly selects an expected journey L from the value range, or automatically selects an expected journey L from the value range of the expected journey according to a preset rule.

Optionally, in another embodiment of the positioning method in the embodiments of the present disclosure, the mobile terminal may first determine a closed path length and a positioning error R that may occur in each positioning scenario, and then the user presets, with reference to each case and each value range of the expected journey L in the foregoing manual selection process, option items that may occur in each positioning scenario.

When the mobile terminal enters different positioning scenarios, the mobile terminal may determine a current positioning scenario, automatically invoke a scenario map corresponding to the positioning scenario, obtain a closed path length and a positioning error R by means of calculation in the current scenario, determine, according to a preset correspondence between a positioning scenario and an expected journey, a preset expected journey corresponding to the current positioning scenario, and set the preset expected journey as the expected journey L. The preset expected journey is an expected journey that is preset by a user for the positioning scenario.

For example, if the mobile terminal enters a dangerous region, a map of the dangerous region is loaded, and the map of the dangerous region matches a first preset scenario map in positioning scenarios, the mobile terminal invokes a preset expected journey (for example, 2 meters) corresponding to the first preset scenario map and uses the preset expected journey as an expected journey for positioning by the mobile terminal in the dangerous region, and if the mobile terminal enters a park, a map of the park is loaded, and the map of the park matches a second preset scenario map in the positioning scenarios, the mobile terminal invokes a preset expected journey (for example, 15 meters) corresponding to the second preset scenario map and uses the preset expected journey as an expected journey for positioning by the mobile terminal in the park.

Optionally, in another embodiment of the positioning method in the embodiments of the present disclosure, the mobile terminal determines a positioning scenario, obtains a value range of an expected journey in the current positioning scenario, and selects an expected journey L from the value range randomly or according to a predefined rule.

Figure 12:
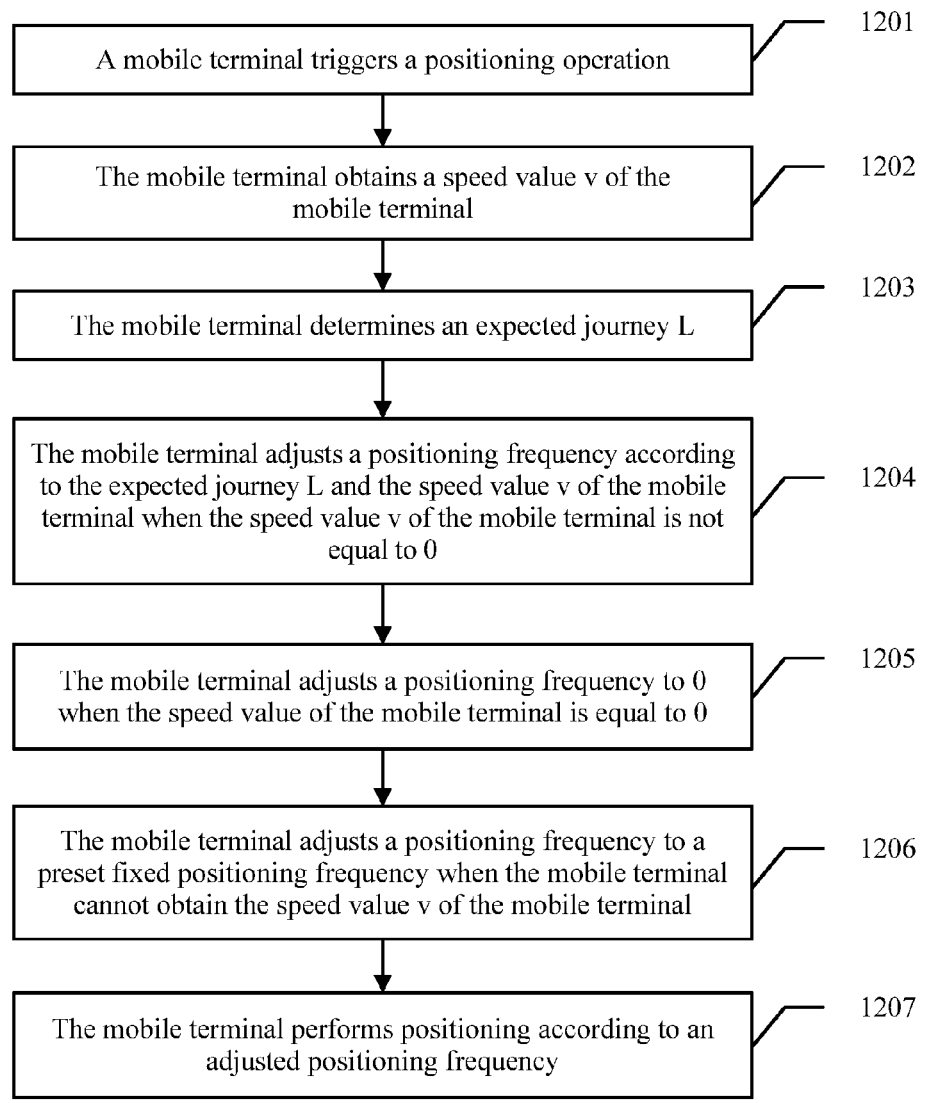
FIG. 12 is another schematic flowchart of a positioning method according to an embodiment of the present disclosure.

The foregoing embodiments separately describe that the mobile terminal may determine the expected journey L in different manners, and may adjust the positioning frequency in different manners such that the deviation of the distance traveled by the mobile terminal between the two consecutive times of positioning from the expected journey L is less than the specified threshold. In actual application, the mobile terminal may further perform different operations according to different situations of the obtained speed value v of the mobile terminal. Referring to FIG. 12, another embodiment of the positioning method in the embodiments of the present disclosure includes the following steps.

In this embodiment, to avoid repetition, the manners in which the mobile terminal adjusts the positioning frequency and determines the expected journey L are not repeatedly described. For a specific process, refer to the methods described in the foregoing embodiments. All the foregoing manners in which the mobile terminal adjusts the positioning frequency and determines the expected journey L may be applied to this embodiment.

Step 1201: A mobile terminal triggers a positioning operation.

The mobile terminal triggers a positioning operation when the mobile terminal is powered on or enables a positioning function to start positioning.

Operations may be classified into different working modes according to different purposes of the operations when the mobile terminal performs positioning. An operation of directly triggering initial positioning by the mobile terminal may be included in a startup mode. The mobile terminal directly enters the startup mode when enabling the positioning function, and triggers a positioning operation in the startup mode. In this way, the following case is avoided. After being powered on, if an obtained speed value is always 0 because of stillness or for another reason, the mobile terminal automatically enters another mode that triggers no positioning operation such that a position of the mobile terminal cannot be learned in an entire positioning process because no positioning operation is triggered.

Step 1202: The mobile terminal obtains a speed value v of the mobile terminal.

The mobile terminal may continuously monitor the speed value of the mobile terminal, and the mobile terminal obtains the speed value v of the mobile terminal when the speed value of the mobile terminal needs to be used in another operation.

Step 1203: The mobile terminal determines an expected journey L.

The mobile terminal determines the expected journey L, where the expected journey L is an expected value of a distance traveled by the mobile terminal between two consecutive times of positioning.

Step 1204: The mobile terminal adjusts a positioning frequency according to the expected journey L and the speed value v of the mobile terminal when the speed value v of the mobile terminal is not equal to 0 such that a deviation of a distance traveled by the mobile terminal between two consecutive times of positioning performed by the mobile terminal according to an adjusted positioning frequency from the expected journey L is less than a specified threshold.

After obtaining the speed value of the mobile terminal, the mobile terminal adjusts the positioning frequency according to the expected journey L and the speed value v of the mobile terminal if the speed value v of the mobile terminal is not equal to 0 such that the deviation of the distance traveled by the mobile terminal between the two consecutive times of positioning performed by the mobile terminal according to the adjusted positioning frequency from the expected journey L is less than the specified threshold.

It may be understood that adjusting the positioning frequency in a positioning process to meet a purpose that the deviation of the distance traveled by the mobile terminal between the two consecutive times of positioning from the expected journey L is less than the specified threshold may be included in a variable-frequency positioning mode. The mobile terminal enters the variable-frequency positioning mode when the obtained speed value v of the mobile terminal is not equal to 0, and the mobile terminal performs step 1204 in the variable-frequency positioning mode.

Step 1203 of determining the expected journey L may be performed after the mobile terminal enters the variable-frequency positioning mode, or may be performed in another opportunity, for example, is performed when the mobile terminal is powered on or starts the positioning function to start positioning, which is not limited herein.

Step 1205: The mobile terminal adjusts a positioning frequency to 0 when the speed value of the mobile terminal is equal to 0.

The mobile terminal adjusts the positioning frequency to 0 when the obtained speed value of the mobile terminal is equal to 0.

The operation in step 1205 may be included in a low energy mode. When the obtained speed value of the mobile terminal is 0, it indicates that in this case, the mobile terminal is still, and a positioning position does not change. If positioning continues to be performed on a specific frequency, electric energy of the mobile terminal is wasted, and positioning positions may mix and overlap. Therefore, when the obtained speed value v of the mobile terminal is equal to 0, the mobile terminal may enter the low energy mode, and the mobile terminal adjusts the positioning frequency to 0 in the low energy mode. In this case, the mobile terminal does not trigger a positioning operation, and enters the low energy state to save electric energy.

Step 1206: The mobile terminal adjusts a positioning frequency to a preset fixed positioning frequency when the mobile terminal cannot obtain the speed value v of the mobile terminal.

When the mobile terminal obtains the speed value of the mobile terminal, it is possible that the speed value v of the mobile terminal cannot be obtained because of a device fault, a speed loss, or the like. The mobile terminal adjusts the positioning frequency to the preset fixed positioning frequency when the mobile terminal cannot obtain the speed value v of the mobile terminal. The positioning frequency is fixed, that is, a positioning time interval between two consecutive times of positioning is fixed. In this case, the mobile terminal triggers a positioning operation according to a fixed time interval $T_{fix}$.

Adjusting the positioning frequency to the preset fixed positioning frequency may be included in a fixed-frequency positioning mode. If the mobile terminal cannot obtain the speed value v of the mobile terminal, the mobile terminal can neither enter the variable-frequency positioning mode for positioning on a changing frequency, nor determine that the mobile terminal is still, and therefore the mobile terminal needs to adjust the positioning frequency to the preset fixed positioning frequency in order to trigger a positioning operation with a fixed time interval. The mobile terminal enters the fixed-frequency positioning mode when the mobile terminal cannot obtain the speed value v of the mobile terminal, and adjusts the positioning frequency to the preset fixed positioning frequency in the fixed-frequency positioning mode.

Step 1207: The mobile terminal performs positioning according to the adjusted positioning frequency.

After adjusting the positioning frequency, the mobile terminal performs positioning according to the adjusted positioning frequency.

It should be noted that the mobile terminal obtains the speed value v of the mobile terminal in step 1202. When entering the startup mode and triggering a positioning operation in step 1201, the mobile terminal obtains the speed value v of the mobile terminal in order to determine, according to a situation of the obtained speed value v of the mobile terminal, which positioning mode the mobile terminal subsequently enters. After entering each positioning mode, a frequency on which the mobile terminal obtains the speed value v of the mobile terminal depends on a requirement of each positioning mode. For example, in the variable-frequency positioning mode, the mobile terminal obtains the speed value v of the mobile terminal each time when triggering a positioning operation if a method for obtaining a second positioning time is used, or the mobile terminal continuously obtains the speed value v of the mobile terminal on a relatively high frequency in an entire process if a method for obtaining a traveled distance of the mobile terminal is used. In the low energy mode, the speed value v of the mobile terminal may be obtained on a specific frequency, or the speed value v of the mobile terminal may be continuously monitored such that a positioning mode is switched according to a situation of v. In the fixed-frequency positioning mode, the speed value v of the mobile terminal is obtained each time when a positioning operation is triggered. Except that in the variable-frequency positioning mode, calculation is performed on the obtained speed value v of the mobile terminal, in other modes, the speed value v of the mobile terminal is obtained to determine whether a condition for entering another positioning mode is met.

It may be understood that an entire positioning process is a continuous cyclic process. After enabling the positioning function, the mobile terminal enters the startup mode and triggers a positioning operation, and then performs switching between the variable-frequency positioning mode, the fixed-frequency positioning mode, and the low energy mode according to a situation of the obtained speed value of the mobile terminal. The switching may last until the positioning function is disabled.

In this embodiment of the present disclosure, when starting positioning, a mobile terminal first enters a startup mode to perform initial positioning, which may avoid the following case, where after being powered on, if an obtained speed value is always 0 because of stillness or for another reason, the mobile terminal automatically enters a low energy mode such that a position of the mobile terminal cannot be learned, and then enters another mode according to a situation of the obtained speed value. The mobile terminal enters a variable-frequency positioning mode when the obtained speed value is not 0. The mobile terminal enters the low energy mode when the obtained speed value is 0. In this way, the mobile terminal can automatically perform positioning during movement, and the mobile terminal stops positioning during stillness and enters the low energy state such that electronic energy can be more effectively and properly utilized, and a standby time of the mobile terminal is improved. When the mobile terminal cannot obtain the speed value v of the mobile terminal, the mobile terminal enters a fixed-frequency positioning mode. In this way, a failure of positioning because of a fault of a speed measurement component of the mobile terminal can be avoided such that a positioning function of the mobile terminal is more reliable.

In the foregoing embodiment, the mobile terminal performs switching between the different positioning modes according to the situation of the obtained speed value v of the mobile terminal. In actual application, before obtaining the situation of the obtained speed value v of the mobile terminal and switching a positioning mode, the mobile terminal may first determine whether duration of the speed value v of the mobile terminal reaches a delay time for switching the positioning mode in order to avoid a misoperation or avoid frequent switching caused by a fluctuation in the obtained speed value of the mobile terminal.

Optionally, before the mobile terminal obtains the speed value v of the mobile terminal, the mobile terminal may further receive a first delay time $T_{sw1}$, a second delay time $T_{sw2}$, and a third delay time $T_{sw3}$ that are set by a user.

The first delay time $T_{sw1}$ is a delay time for determining whether to enter the variable-frequency positioning mode.

That the mobile terminal enters the variable-frequency positioning mode when the speed value v of the mobile terminal is not equal to 0 may include that the mobile terminal enters the variable-frequency positioning mode when the speed value v of the mobile terminal is not equal to 0 and duration is greater than the first delay time $T_{sw1}$.

The second delay time $T_{sw2}$ is a delay time for determining whether to enter the low energy mode.

That the mobile terminal enters the low energy mode when the speed value of the mobile terminal is equal to 0 may include that the mobile terminal enters the low energy mode when the speed value of the mobile terminal is equal to 0 and duration is greater than the second delay time $T_{sw2}$.

The third delay time $T_{sw3}$ is a delay time for determining whether to enter the fixed-frequency positioning mode.

That the mobile terminal enters the fixed-frequency positioning mode when the mobile terminal cannot obtain the speed value v of the mobile terminal may include that the mobile terminal enters the fixed-frequency positioning mode when the mobile terminal cannot obtain the speed value v of the mobile terminal and duration is greater than the third delay time $T_{sw3}$.

Figure 13:
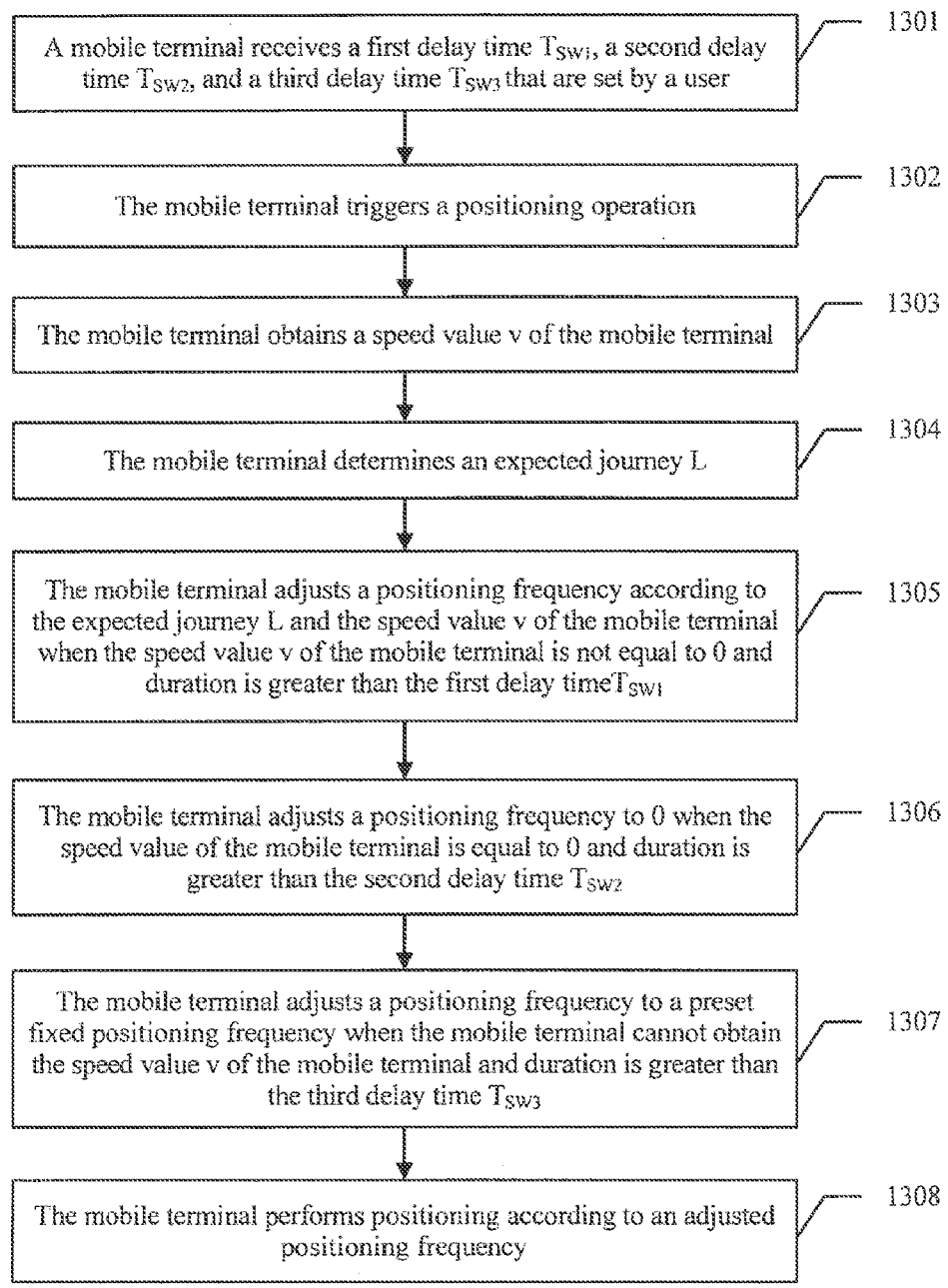
FIG. 13 is another schematic flowchart of a positioning method according to an embodiment of the present disclosure.

Referring to FIG. 13, another embodiment of the positioning method in the embodiments of the present disclosure includes the following steps.

Step 1301: A mobile terminal receives a first delay time $T_{sw1}$, a second delay time $T_{sw2}$, and a third delay time $T_{sw3}$ that are set by a user.

Before enabling a positioning function, the mobile terminal may receive the first delay time $T_{sw1}$, the second delay time $T_{sw2}$, and the third delay time $T_{sw3}$ that are set by the user.

Step 1302: The mobile terminal triggers a positioning operation.

Step 1303: The mobile terminal obtains a speed value v of the mobile terminal.

Step 1304: The mobile terminal determines an expected journey L.

Step 1305: The mobile terminal adjusts a positioning frequency according to the expected journey L and the speed value v of the mobile terminal when the speed value v of the mobile terminal is not equal to 0 and duration is greater than the first delay time $T_{sw1}$ such that a deviation of a distance traveled by the mobile terminal between two consecutive times of positioning performed by the mobile terminal according to an adjusted positioning frequency from the expected journey L is less than a specified threshold.

Step 1306: The mobile terminal adjusts a positioning frequency to 0 when the speed value of the mobile terminal is equal to 0 and duration is greater than the second delay time $T_{sw2}$.

Step 1307: The mobile terminal adjusts a positioning frequency to a preset fixed positioning frequency when the mobile terminal cannot obtain the speed value v of the mobile terminal and duration is greater than the third delay time $T_{sw3}$.

Step 1308: The mobile terminal performs positioning according to the adjusted positioning frequency.

Except that duration determining is performed before the positioning frequency is adjusted according to a difference of the speed value of the mobile terminal, another execution process is similar to that in the embodiment shown in FIG. 12, and is not repeatedly described herein.

There is a delay time for determining before switching to each positioning mode such that a misoperation can be effectively avoided, and status switching is more stable.

Figure 14:
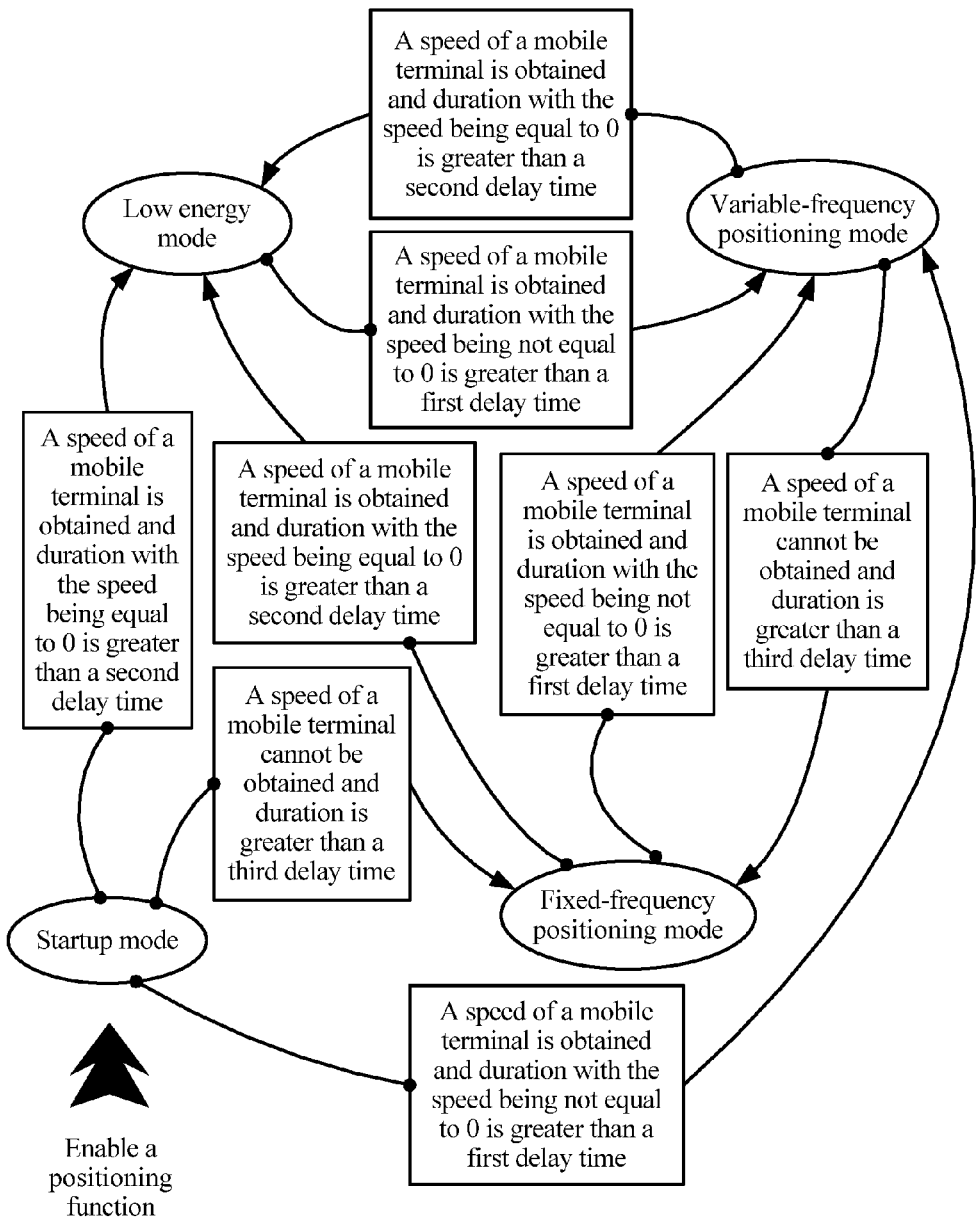
FIG. 14 is a schematic diagram of positioning status switching of a mobile terminal.

FIG. 14 shows a schematic diagram of positioning status switching of a mobile terminal. The mobile terminal shifts, according to corresponding conditions in square boxes, between four positioning modes shown in ellipses.

In a startup mode, the mobile terminal forcibly triggers a positioning operation when enabling a positioning function.

In a variable-frequency positioning mode, a positioning frequency is adjusted when a speed value of the mobile terminal is not 0 such that a deviation of a distance traveled by the mobile terminal between two consecutive times of positioning performed according to an adjusted positioning frequency from an expected journey L is less than a specified threshold.

In a low energy mode, a positioning frequency is adjusted to 0 when a speed value of the mobile terminal is 0.

In a fixed-frequency positioning mode, a positioning frequency is adjusted to a preset fixed positioning frequency when a speed value of the mobile terminal cannot be obtained.

It may be understood that in a special case, after the mobile terminal enters the startup mode and triggers a positioning operation, if the speed value obtained by the mobile terminal is always in an unstable state and cannot meet a delay time for entering any another positioning mode, it may be set when the mobile terminal does not obtain a stable speed value in a preset time to enter any one of the variable-frequency positioning mode, the low energy positioning mode, or the fixed-frequency positioning mode, after the preset time elapses, the mobile terminal may directly enter the fixed-frequency positioning mode, and then perform mutual shifting according to a situation of the speed value v of the mobile terminal and according to a rule for shifting between the modes.

In the foregoing embodiment, when meeting all conditions, the mobile terminal triggers a positioning operation and performs positioning. In actual application, there are multiple manners for positioning by the mobile terminal. The following two main manners may be included. Inertial navigation positioning in which sensor data obtained by various sensors (such as an acceleration sensor, a gyroscope, and a magnetic sensor) integrated into the mobile terminal is processed using a related algorithm without using an external infrastructure, and wireless positioning performed using an external signal such as a WiFi, BLUETOOTH, or cellular signal. In this embodiment of the present disclosure, when a positioning operation is triggered to perform positioning, the inertial navigation positioning may be used, or the wireless positioning may be used, or a manner combining the inertial navigation positioning and the wireless positioning may be used, which is not limited herein.

Optionally, if the inertial navigation positioning is used to perform positioning, an initial position, an azimuth, and another related parameter that are included in an initial condition for the inertial navigation positioning may be calibrated in advance.

Optionally, the mobile terminal may specify a priority of a manner used to trigger a positioning operation. For example, it may be specified that a priority of the wireless positioning is higher than that of the inertial navigation positioning, and after a positioning operation is triggered, whether a wireless signal can be received is first determined. The wireless positioning is used is a wireless signal can be received, and if no wireless signal can be received, it indicates that the wireless positioning cannot be used, but the inertial navigation positioning can be used.

Optionally, the mobile terminal may set that only the inertial navigation positioning is used. Because no external infrastructure needs to be used in the inertial navigation positioning, the inertial navigation positioning can be immediately used once a condition for triggering a positioning operation is met.

However, the wireless positioning is different because an external infrastructure (such as a locator) needs to be used.

There are two network systems for performing wireless positioning calculation by the mobile terminal. One is a network-centric positioning system, and the other is a mobile terminal-centric positioning system.

In the network-centric wireless positioning system, a mobile terminal periodically broadcasts a wireless signal. A nearby infrastructure locator device receives the wireless signal of the mobile terminal, extracts an address or an identifier (ID) of the mobile terminal, measures a related physical quantity such as a received signal strength indicator (RSSI) or an angle of arrival (AOA), and sends the address or the ID of the mobile terminal and the related physical quantity to a server together with related information such as an address or an ID of the locator device, and the server calculates a coordinate value of the mobile terminal.

In the mobile terminal-centric positioning system, an infrastructure locator device periodically broadcasts a wireless signal. The mobile terminal receives the wireless signal of the locator, extracts related information such as an address, coordinates, or an ID of the locator device, measures a related physical quantity such as an RSSI or an AOA, calculates a coordinate value of the mobile terminal using the information, and displays a position on a screen of the mobile terminal.

Optionally, in the network-centric wireless positioning system, that a mobile terminal triggers a positioning operation may include that the mobile terminal broadcasts a wireless signal once such that after receiving the wireless signal, a nearby infrastructure locator sends related information of the mobile terminal to a server to obtain a coordinate value of the mobile terminal by means of calculation.

Optionally, in the mobile terminal-centric positioning system, that a mobile terminal triggers a positioning operation may include that after triggering a positioning operation, when receiving another wireless signal sent by an infrastructure locator, the mobile terminal obtains a coordinate value of the mobile terminal by means of calculation according to related information of the infrastructure locator.

It may be understood that because a locator sends a wireless signal on a fixed frequency instead of continuously sending, the mobile terminal needs to perform one time of positioning immediately after triggering a positioning operation. However, in some cases, a period for sending a wireless signal by the locator may not reach in this case such that the mobile terminal cannot immediately perform one time of positioning. Therefore, in this case, to ensure that after positioning, a track between two positioning points is close to an expected journey as much as possible, after triggering a positioning operation, the mobile terminal performs one time of positioning when receiving the latest wireless signal sent by the locator, that is, obtains a coordinate value of the mobile terminal by means of calculation according to related information of the infrastructure locator.

For ease of understanding, the following describes in detail the positioning method in the embodiments of the present disclosure using a specific application scenario.

Before enabling a positioning function, a mobile terminal may receive an expected journey L (for example, 10 meters), a fixed time interval $T_{fix}$ (for example, 2 seconds) used in a fixed-frequency positioning mode, a first delay time $T_{sw1}$ (for example, 500 milliseconds) used to determine whether to enter a variable-frequency positioning mode, a second delay time $T_{sw2}$ (for example, 600 milliseconds) used to determine whether to enter a low energy mode, a third delay time $T_{sw3}$ (for example, 700 milliseconds) used to determine whether to enter the fixed-frequency positioning mode, and a minimum time interval $T_{min}$ (for example, 1 second) that are set by a user.

When the user enables the positioning function, the mobile terminal enters a startup mode, triggers a positioning operation, and performs positioning in a wireless positioning manner. In a network-centric positioning system, the mobile terminal may broadcast a wireless signal once to perform positioning. In a mobile terminal-centric positioning system, the mobile terminal may receive the latest wireless signal sent by a nearby infrastructure locator to perform positioning.

After one time of positioning, the mobile terminal obtains a speed value v of the mobile terminal. An obtaining manner may be obtaining a speed value measured by each sensor (such as an acceleration sensor) or a speedometer that is mounted on the mobile terminal.

If the obtained speed value v of the mobile terminal is 0, and duration is greater than the second delay time $T_{sw2}$ of 600 milliseconds, the mobile terminal adjusts a positioning frequency to 0, enters a low energy state, and continuously obtains the speed value v of the mobile terminal. If the speed value v of the mobile terminal can be obtained, and v is always 0, the mobile terminal keeps in the low energy mode, and continuously obtains v until the positioning function is disabled or v changes.

When the obtained speed value v of the mobile terminal is not 0 (for example, is 2 meters per second (m/s)) and duration is greater than the first delay time $T_{sw1}$ of 500 milliseconds, the mobile terminal enters a variable-frequency positioning mode. In this mode, the positioning frequency may be adjusted in two manners. Manner 1 includes triggering, by the mobile terminal, a positioning operation after 5 seconds if the mobile terminal obtains a time interval T of 5 seconds by means of calculation according to a formula T=L/v, and the time interval T of 5 seconds is greater than the minimum time interval of 1 second, and manner 2 includes continuously obtaining a speed v, performing integration on the speed v in terms of time, and triggering a positioning operation if a deviation of a traveled distance L' that is of the mobile terminal and obtained by means of integration over 5 seconds from an expected journey L is less than a preset threshold of 0.1 meters. After the positioning operation is triggered, positioning is performed in a wireless positioning manner that may include that in the network-centric positioning system, the mobile terminal broadcasts a wireless signal once after 5 seconds, a nearby infrastructure locator device receives the wireless signal of the mobile terminal, extracts an address or an ID of the mobile terminal, measures a related physical quantity such as an RSSI or an AOA, and sends the address or the ID of the mobile terminal and the physical quantity to a server together with related information such as an address or an ID of the locator device, and the server calculates a coordinate value of the mobile terminal, or in the mobile terminal-centric positioning system, the mobile terminal receives, after 5 seconds, the latest wireless signal sent by an infrastructure locator, and calculates a coordinate value of the mobile terminal according to related information of the infrastructure locator.

In the variable-frequency positioning mode, if the mobile terminal obtains another speed value v of 4 m/s of the mobile terminal after performing one time of positioning, and duration is greater than the first delay time $T_{sw1}$ of 500 milliseconds, the mobile terminal keeps in the variable-frequency positioning mode. If the mobile terminal obtains a time interval T of 2.5 seconds by means of calculation according to a formula T=L/v, and the time interval of 2.5 seconds is greater than the minimum time interval of 1 second, the mobile terminal triggers a positioning operation after 2.5 seconds, and performs positioning in a wireless positioning manner. If no wireless signal is detected in this case, the mobile terminal may perform one time of positioning in an inertial navigation positioning manner.

When the mobile terminal cannot obtain the speed value v of the mobile terminal because of a fault of a speed measurement component of the mobile terminal or a speed loss, and duration is greater than the third delay time $T_{sw3}$ of 700 milliseconds, the mobile terminal enters the fixed-frequency positioning mode, and triggers a positioning operation every 2 seconds according to the fixed time interval $T_{fix}$ of 2 seconds.

As such, the mobile terminal switches between the variable-frequency positioning mode, the low energy mode, and the fixed-frequency positioning mode according to a situation of the obtained speed value v of the mobile terminal.

Figure 15:
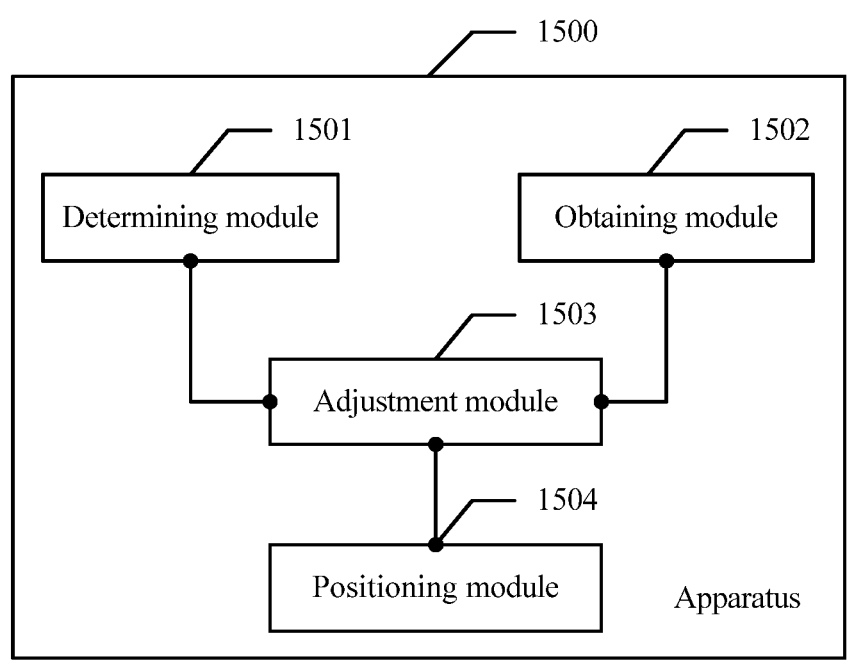
FIG. 15 is a schematic structural diagram of an apparatus according to an embodiment of the present disclosure.

The following describes an apparatus for executing the positioning method in the embodiments of the present disclosure. Referring to FIG. 15, an embodiment of an apparatus 1500 in the embodiments of the present disclosure includes a determining module 1501 configured to determine an expected journey L, where the expected journey is an expected value of a distance traveled by the apparatus between two consecutive times of positioning, an obtaining module 1502 configured to obtain a speed value v of the apparatus, an adjustment module 1503 configured to adjust a positioning frequency according to the expected journey L determined by the determining module 1501 and the speed value v that is of the apparatus and obtained by the obtaining module 1502 such that a deviation of a distance traveled by the apparatus between two consecutive times of positioning performed by a positioning module 1504 according to an adjusted positioning frequency from the expected journey L is less than a specified threshold, and the positioning module 1504 configured to perform positioning according to the positioning frequency adjusted by the adjustment module 1503.

In this embodiment of the present disclosure, a determining module 1501 first determines an expected journey L, where the expected journey is an expected value of a distance traveled by the apparatus between two consecutive times of positioning, and an obtaining module 1502 then obtains a speed value v of the apparatus. Afterwards, an adjustment module 1503 adjusts a positioning frequency according to the expected journey L and the speed value v of the apparatus such that a deviation of a distance traveled by the apparatus between two consecutive times of positioning performed according to an adjusted positioning frequency from the expected journey L is less than a specified threshold, and a positioning module 1504 performs positioning according to the adjusted positioning frequency. In this way, an average length of positioning tracks between two consecutive times of positioning differs little from the expected journey L, track fitting precision is improved, and erroneous track determining is eliminated. FIGS. 2A, 2B, 2C and 2D show distribution situations of positioning position points when different values d1, d2, d3, and d4 are assigned to the expected journey L. Because distribution intervals between the positioning position points are basically even and controllable, a traveling track of a target can be accurately estimated during fast movement in a complex scenario by assigning a proper value to the expected journey L, which reduces a probability of erroneously determining the traveling track because of the complex scenario or an excessively fast movement speed.

Further, because of a change of a traveling speed of a target, positioning performed on a fixed frequency in other approaches may cause unevenly scattered positioning positions, which affects a positioning presentation effect and user experience. When the traveling speed of the target is relatively slow, the positioning positions mix and overlap because of a positioning error, which makes a user sensually confused. When the apparatus slows down after moving a distance, a positioning position mixing and overlapping phenomenon shown in FIG. 4 is caused, and when a speed of the apparatus suddenly becomes fast, an uneven positioning effect shown in FIG. 5 is caused.

However, using the positioning method in the embodiments of the present disclosure, a positioning presentation effect is improved. As shown in FIG. 6, the positioning position points of the apparatus are basically distributed at a distance interval close to that expected by the user. In addition, distribution is more even, and a change of a movement speed of the terminal has little impact on a distribution effect. For all positioning applications in various movement forms, a positioning presentation effect can be improved. In addition, an adaptive positioning frequency can be automatically set. A suitable positioning frequency can be automatically obtained by means of calculation according to the expected journey L set by the user and the speed v of the mobile terminal in order to ensure that an average length of positioning tracks between two consecutive times of positioning differs little from the expected journey L.

In the foregoing embodiment, the adjustment module 1503 adjusts the positioning frequency according to the expected journey L determined by the determining module 1501 and a speed value v that is of the apparatus and obtained by the obtaining module 1502. In actual application, there are multiple implementation manners for adjusting the positioning frequency. The following uses two of the implementation manners as examples for description.

Figure 16:
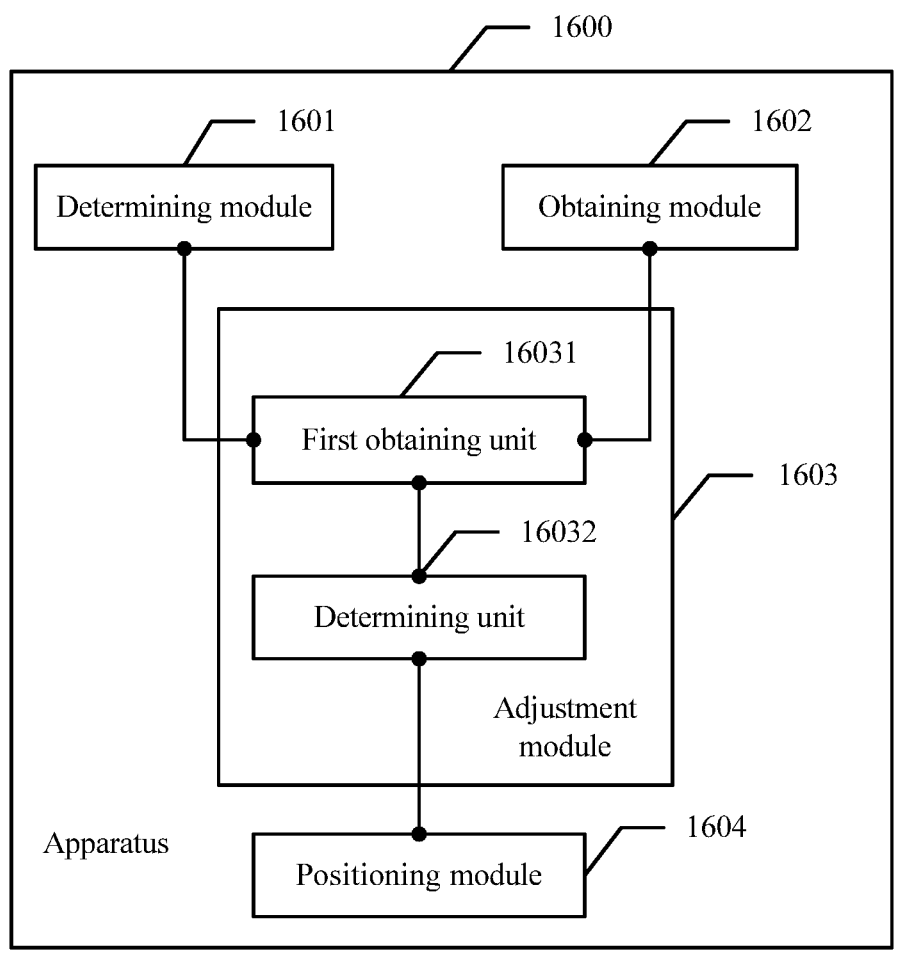
FIG. 16 is another schematic structural diagram of an apparatus according to an embodiment of the present disclosure.

Manner I: The adjustment module 1503 directly obtains a next positioning time t by means of calculation according to the expected journey L and the speed value v of the apparatus. Referring to FIG. 16, another embodiment of an apparatus 1600 in the embodiments of the present disclosure includes a determining module 1601 configured to determine an expected journey L, where the expected journey is an expected value of a distance traveled by the apparatus between two consecutive times of positioning, an obtaining module 1602 configured to obtain a speed value v of the apparatus, an adjustment module 1603 configured to adjust a positioning frequency according to the expected journey L determined by the determining module 1601 and the speed value v that is of the apparatus 1600 and obtained by the obtaining module 1602 such that a deviation of a distance traveled by the apparatus 1600 between two consecutive times of positioning performed by a positioning module 1604 according to an adjusted positioning frequency from the expected journey L is less than a specified threshold, and the positioning module 1604 configured to perform positioning according to the positioning frequency adjusted by the adjustment module 1603.

In this embodiment, the adjustment module 1603 is further configured to obtain a second positioning time t according to the expected journey L and the speed value v of the apparatus when a first positioning operation is triggered such that after positioning is performed according to the second positioning time t, a deviation of a distance traveled by the apparatus between the first positioning operation and a second positioning operation from the expected journey L is less than the specified threshold.

In this case, the positioning module 1604 is further configured to trigger the second positioning operation at the second positioning time t obtained by the adjustment module 1603.

It may be understood that, the first positioning operation may also be triggered by the positioning module 1604.

It should be noted that, that the positioning module 1604 triggers a positioning operation to perform positioning may include that the positioning module 1604 performs positioning using various positioning technologies (such as wireless positioning or inertial navigation positioning), or may include that the positioning module 1604 triggers another positioning apparatus such as a radio frequency module or a positioning operation module to perform positioning when a condition for triggering a positioning operation is met, which is not limited herein.

There may be multiple specific operations in which the adjustment module 1603 obtains the second positioning time t according to the expected journey L and the speed value v of the apparatus 1600. For example, the adjustment module 1603 may further include a first obtaining unit 16031 configured to obtain a time interval T according to the formula $T=L/v$, that is, the time interval T is equal to a ratio of the expected journey L to the speed value v of the apparatus, and a determining unit 16032 configured to determine the second positioning time t as a sum value of a current moment determined by the apparatus and the time interval T.

It may be understood that to adjust the positioning frequency in this manner, the obtaining module 1602 obtains a current speed value v of the apparatus during each time of positioning. The current moment is a moment at which the positioning module 1604 is performing a positioning operation, and is also a moment at which the obtaining module 1602 obtains the speed value v of the apparatus. The obtaining module 1602 obtains the speed value v of the apparatus, with the purpose of enabling the adjustment module 1603 to obtain a next positioning time by means of calculation.

When the positioning module 1604 is performing the first positioning operation at the current moment, the obtaining module 1602 obtains the speed value v of the apparatus 1600 at the current moment, the first obtaining unit 16031 obtains, by means of calculation, a time interval T for a second time of positioning according to the formula $T=L/v$, and the determining unit 16032 obtains the second positioning time t by adding the time interval T to the current moment. If the time interval T is relatively short, v changes little in the time T, and then a distance S traveled by the apparatus 1600 is approximately equal to $v*T=L$ between the two times of positioning triggered by the positioning module 1604, that is, the first positioning operation and the second positioning operation. When the positioning module 1604 performs the second positioning operation at the time t, the obtaining module 1602 obtains another speed value of the apparatus, and the adjustment module 1603 obtains another time interval by means of calculation according to the expected journey L and the speed value v of the apparatus 1600 to obtain a next positioning time. Therefore, a purpose of adjusting the positioning frequency to ensure that the deviation of the distance traveled by the mobile terminal between the two consecutive times of positioning from the expected journey L is less than the specified threshold is achieved.

Optionally, when the adjustment module 1603 calculates the second positioning time t using the foregoing steps, considering a delay in obtaining the speed value v by the obtaining module 1602 or a possible change situation of the speed value v of the apparatus between the two times of positioning, deviation adjustment may be performed on the second positioning time t obtained by means of calculation. For example, a deviation time may be subtracted from the obtained second positioning time t, or the obtained second positioning time t is multiplied by a weighted value, which is not limited herein.

Optionally, in actual application, there are many specific implementation manners for triggering the second positioning operation by the positioning module 1604 at the second positioning time t. It is not necessarily required that the determining unit 16032 obtains a next positioning time by adding the time interval T obtained by the first obtaining unit 16031 by means of calculation to a current moment, and then the positioning module 1604 performs positioning after the next positioning time t arrives. For example, the positioning module 1604 may directly start a timer with a time T after the first obtaining unit 16031 obtains the time interval T by means of calculation, and the positioning module 1604 triggers the second positioning operation when the time T of the timer arrives. This manner may also be included in triggering the second positioning operation by the positioning module 1604 at the second positioning time t. There may further be many other specific implementation manners, which are not limited herein.

Optionally, after the first obtaining unit 16031 obtains the time interval T, the apparatus 1600 may first determine whether the time interval T is greater than a minimum time interval. If the time interval T is less than the minimum time interval, the minimum time interval is used as the time interval between the first time of positioning and the second time of positioning, or if the time interval T is greater than the minimum time interval, the time interval T is used as the time interval between the first time of positioning and the second time of positioning. In this way, an excessively high positioning frequency caused by an excessively fast speed of the mobile terminal can be avoided.

In this embodiment of the present disclosure, an adjustment module 1603 obtains a second positioning time t by means of calculation according to an expected journey L and a speed value v of an apparatus, and a positioning module 1604 triggers a second positioning operation at the second positioning time t such that a deviation of a distance traveled by the apparatus between two consecutive times of positioning from the expected journey L is less than a specified threshold. A speed value v that is of the apparatus and obtained during each time of positioning is different such that a frequency for each time of positioning correspondingly changes, and a purpose of making the distance traveled by the mobile terminal between the two times of positioning differ little from the expected journey L can be achieved only with an extremely small calculation amount.

Figure 17:
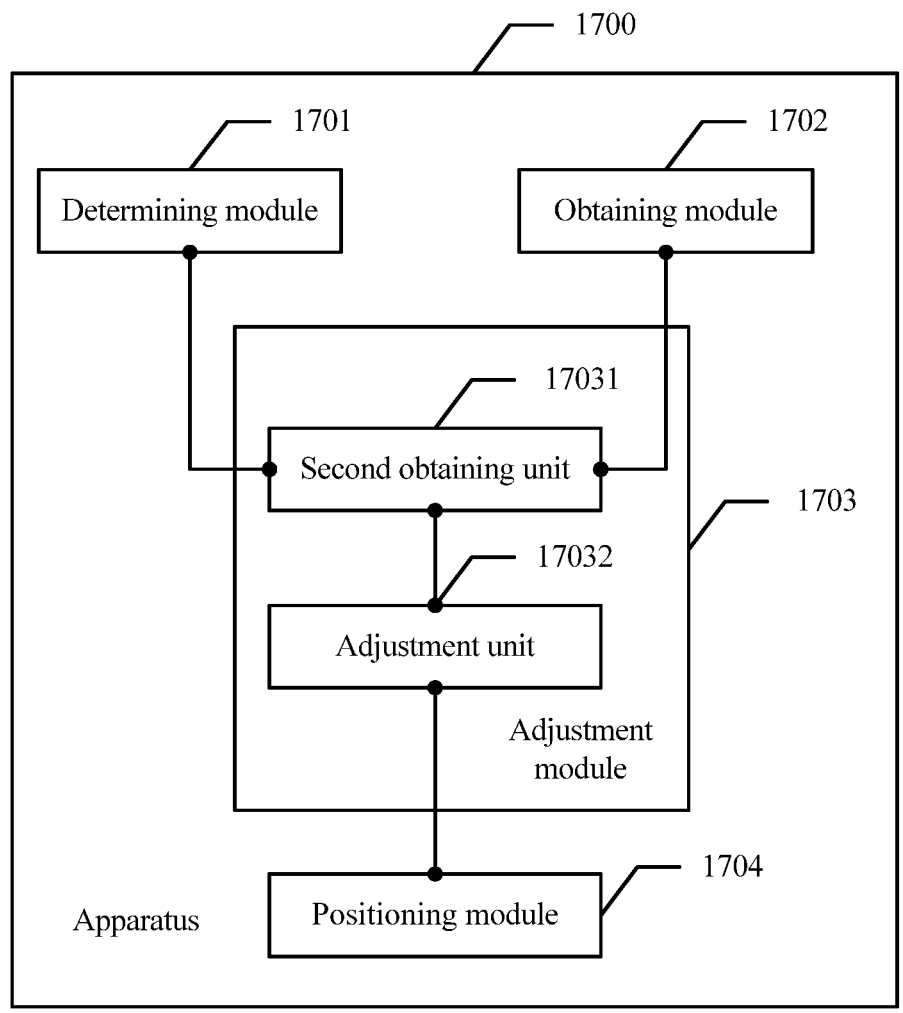
FIG. 17 is another schematic structural diagram of an apparatus according to an embodiment of the present disclosure.

Manner II: The adjustment module 1603 obtains a traveled distance L' of the mobile terminal according to the speed value v of the apparatus, and adjusts the positioning frequency according to the traveled distance L' and the expected journey L. Referring to FIG. 17, another embodiment of the apparatus 1700 in the embodiments includes a determining module 1701 configured to determine an expected journey L, where the expected journey is an expected value of a distance traveled by the apparatus between two consecutive times of positioning, an obtaining module 1702 configured to obtain a speed value v of the apparatus, an adjustment module 1703 configured to adjust a positioning frequency according to the expected journey L determined by the determining module 1701 and the speed value v that is of the apparatus and obtained by the obtaining module 1702 such that a deviation of a distance traveled by the apparatus between two consecutive times of positioning performed by a positioning module 1704 according to an adjusted positioning frequency from the expected journey L is less than a specified threshold, and the positioning module 1704 configured to perform positioning according to the positioning frequency adjusted by the adjustment module 1703.

In this embodiment, the adjustment module 1703 further includes a second obtaining unit 17031 configured to obtain a traveled distance L' of the apparatus by performing integration on the speed value v of the apparatus in terms of time starting from a time point at which a first positioning operation is triggered, and an adjustment unit 17032 configured to adjust the positioning frequency according to the traveled distance L' obtained by the second obtaining unit 17031 and the expected journey L such that the deviation of the distance traveled by the apparatus between the two consecutive times of positioning performed by the positioning module 1704 according to the adjusted positioning frequency from the expected journey L is less than the specified threshold.

A specific process in which the second obtaining unit 17031 obtains the traveled distance L' of the mobile terminal by performing integration on the speed value v of the apparatus in terms of time may be as follows.

Assuming that an $i^{th}$ positioning time of the positioning module 1704 is $t_i$, and the obtaining module 1702 obtains a speed value on a high frequency, for example, obtains one instantaneous speed v every other small time period dt, the second obtaining unit 17031 performs the following accumulative operation starting from the time $t_i$ for the traveled distance L' of apparatus:

$$L' = \sum_{j=1}^{n} v_j dt,$$

where $v_j$ represents an instantaneous speed obtained by the obtaining module 1702 at a $j^{th}$ time starting from the moment $t_i$. An operation process of the traveled distance shown in the foregoing formula can be equivalently represented using FIGS. 9A and B. FIG. 9A shows a speed that is of the mobile terminal and obtained by the second obtaining unit 17031 between two consecutive times of positioning, where a horizontal coordinate of each vertical line represents a time at which the obtaining module 1702 obtains a speed, a height of a vertical line represents a speed value that is of the apparatus 1700 and obtained by the obtaining module 1702, a distance between two adjacent vertical lines represents a time interval dt for obtaining a speed, and an area of a vertical bar including two adjacent vertical lines represents an estimated value of a distance traveled by the apparatus 1700 in the time dt. Therefore, from the moment $t_i$ to any time t, an area surrounded by vertical lines corresponding to the moment $t_i$ and the moment t, a time coordinate axis, and a speed envelope line is an estimated value of a distance traveled by the apparatus from the moment $t_i$ to the moment t. The area corresponds to a value of a traveled distance curve at the moment t in FIG. 9B. With continuous accumulation of the traveled distance, until a difference between L' and the expected journey L is less than the specified threshold at a moment $t_{i+1}$, it is determined that a next time of positioning is performed at the moment $t_{i+1}$, and a positioning operation is triggered.

It may be understood that although the foregoing operation process is a manner used in actual engineering for dividing a time into small segments to separately obtain distances by means of calculation and then performing accumulation, but instead of a purely valued integral operation, an idea of integration is applied. Therefore, both a purely valued integral operation manner and a manner using the idea of integration to divide a time period into multiple small segments and then perform accumulation are regarded as a manner used by the second obtaining unit 17031 to perform integration on the speed value v of the mobile terminal in terms of time.

It may be understood that in this embodiment, when the adjustment module 1703 adjusts the positioning frequency, the obtaining module 1702 may continuously obtain the speed value v of the apparatus on an extremely high frequency, and then the second obtaining unit 17031 obtains the traveled distance L' of the mobile terminal by performing integration on the speed value v of the apparatus in terms of time.

It may be understood that after the second obtaining unit 17031 obtains the traveled distance L' of the mobile terminal by means of integration, considering an obtaining delay, an error, or the like, the second obtaining unit 17031 may further perform some deviation operations on the traveled distance L', and then perform subsequent processing.

It may be understood that obtaining, by the second obtaining unit 17031, the traveled distance L' of the mobile terminal by performing integration on the speed value v of the apparatus in terms of time is a continuous process from triggering the first positioning operation to triggering the second positioning operation. The traveled distance L' continuously increases with time. Therefore, adjusting the positioning frequency by the adjustment unit 17032 is also a continuous process, which lasts until triggering of the second positioning operation is determined. However, a condition for determining triggering of the second positioning operation by the adjustment unit 17032 is that the traveled distance L' and the expected journey L are less than the specified threshold.

A result of adjusting the positioning frequency by the adjustment unit 17032 is as follows. When the adjustment unit 17032 determines that the traveled distance L' and the expected journey L are less than the specified threshold, the second positioning operation is triggered, and then the second obtaining unit 17031 obtains, by performing integration on the speed value v of the apparatus in terms of time starting from a time point at which the second positioning operation is triggered, another distance L' traveled by the mobile terminal between the second positioning operation and a third positioning operation, and so on.

The specified threshold may be preset according to an application scenario of the mobile terminal, or may be preset by a manufacturer before delivery, or may be customized by a user each time before positioning, which is not limited herein.

It may be understood that the specified threshold is a deviation value of an actual distance traveled by the mobile terminal from the expected journey L of the mobile terminal, and therefore the specified threshold needs to be far less than the expected journey L.

In the foregoing embodiment, the second obtaining unit 17031 obtains the traveled distance L' by means of integration, and the adjustment unit 17032 adjusts the positioning frequency according to the traveled distance L' and an expected journey L such that the obtained traveled distance of the apparatus 1700 is more accurate, and a condition that the deviation of the distance traveled by the mobile terminal between the two consecutive times of positioning from the expected journey L is less than the specified threshold can be more accurately met.

The foregoing describes that the adjustment module in each of the foregoing embodiments may adjust the positioning frequency in different manners such that the deviation of the distance traveled by the mobile terminal between the two consecutive times of positioning from the expected journey L is less than the specified threshold. Further, in actual application, the determining module in each of the foregoing embodiments may also determine the expected journey in multiple manners. The following describes in detail the step in which the mobile terminal determines the expected journey L.

It may be understood that to avoid repetition, various manners for determining the expected journey by the determining module are described in the following with reference to only the apparatus embodiment shown in FIG. 15. However, the various manners for determining the expected journey by the determining module may be also applied to any one of the foregoing apparatus embodiments shown in FIG. 15, FIG. 16, or FIG. 17.

The expected journey L determined by the determining module 1501 in each of the different positioning scenarios may be manually set by a user, or may be automatically selected by the determining module 1501 according to the positioning scenario.

Manner I: Manual Setting.

To ensure that the specified expected journey L meets a final displayed positioning effect a movement track is not erroneously determined, positioning points do not mix and overlap, and the like, if manually setting is used, the determining module 1501 may give a value range of different expected journeys according to different positioning scenarios such that the user selects the expected journey L from the value range.

Figure 18:
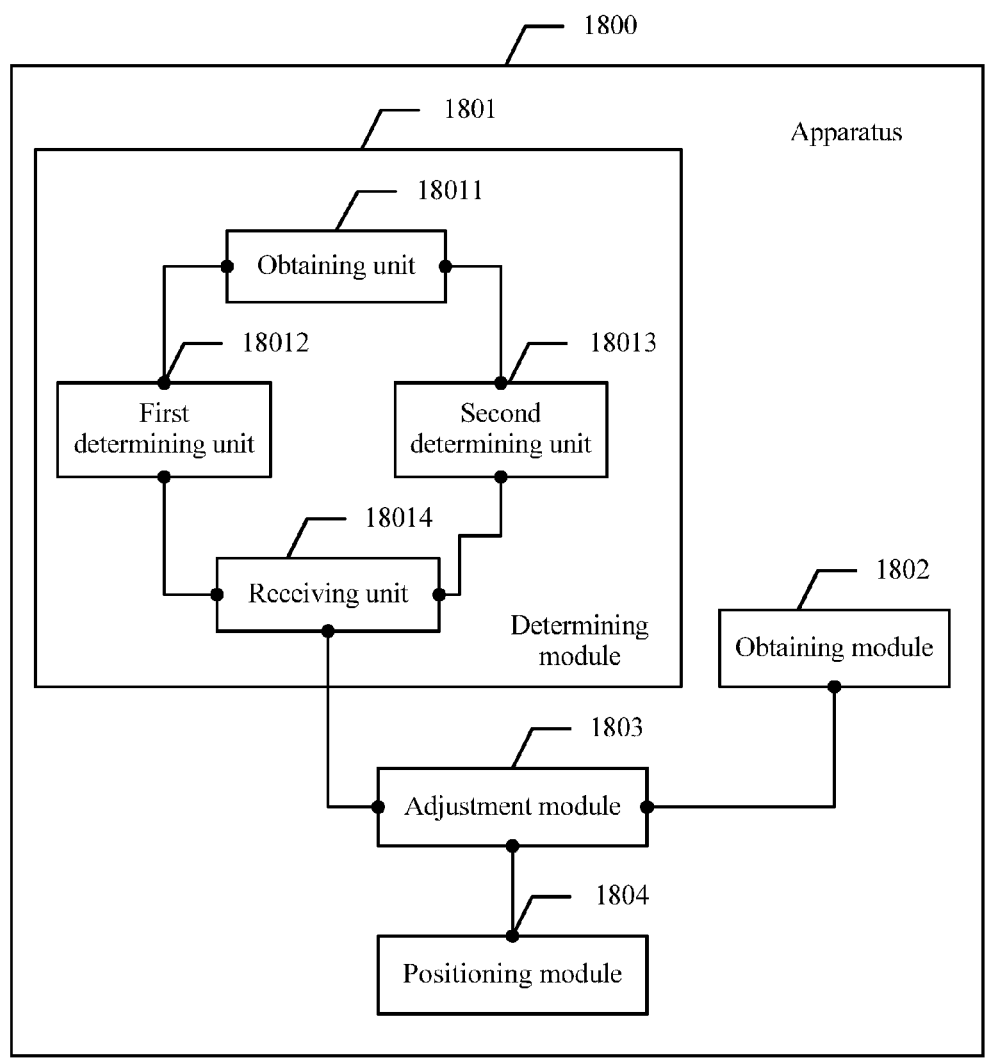
FIG. 18 is another schematic structural diagram of an apparatus according to an embodiment of the present disclosure.

Referring to FIG. 18, another embodiment of the apparatus 1800 in the embodiments of the present disclosure includes a determining module 1801 configured to determine an expected journey L, where the expected journey is an expected value of a distance traveled by the apparatus between two consecutive times of positioning, an obtaining module 1802 configured to obtain a speed value v of the apparatus, an adjustment module 1803 configured to adjust a positioning frequency according to the expected journey L determined by the determining module 1801 and the speed value v that is of the apparatus and obtained by the obtaining module 1802 such that a deviation of a distance traveled by the apparatus between two consecutive times of positioning performed by a positioning module 1804 according to an adjusted positioning frequency from the expected journey L is less than a specified threshold and the positioning module 1804 configured to perform positioning according to the positioning frequency adjusted by the adjustment module 1803.

In this embodiment, the determining module 1801 includes an obtaining unit 18011 configured to obtain a positioning error R and lengths of closed paths that surround all unreachable regions in a positioning scenario, a first determining unit 18012 configured to determine a value range of the expected journey L as $2R<L<(C/2)$ when a minimum closed path length C is greater than 4R, a second determining unit 18013 configured to determine a value range of the expected journey L as $2R<L<(C_1/2)$ when a minimum closed path length C is not greater than 4R, where $C_1$ is a minimum closed path length greater than 4R, and a receiving unit 18014 configured to receive an expected journey L selected by a user from the value range of the expected journey L.

The determining module 1801 sets the expected journey in the foregoing manner, which can ensure that a positioning track obtained by positioning does not mix and overlap, and no erroneous determining is caused.

Manner II: Automatic Selection.

There may also be multiple types of automatic selection. One type may include that the user first sets expected journeys in possible positioning scenarios and then performs matching when determining a positioning scenario. Another type may include that after determining a positioning scenario, the determining module 1801 determines a value range of an expected journey L in the background in the manner in the foregoing manual selection process, and then the determining module 1801 randomly selects an expected journey L from the value range, or automatically selects an expected journey L from the value range of the expected journey according to a preset rule.

Figure 19:
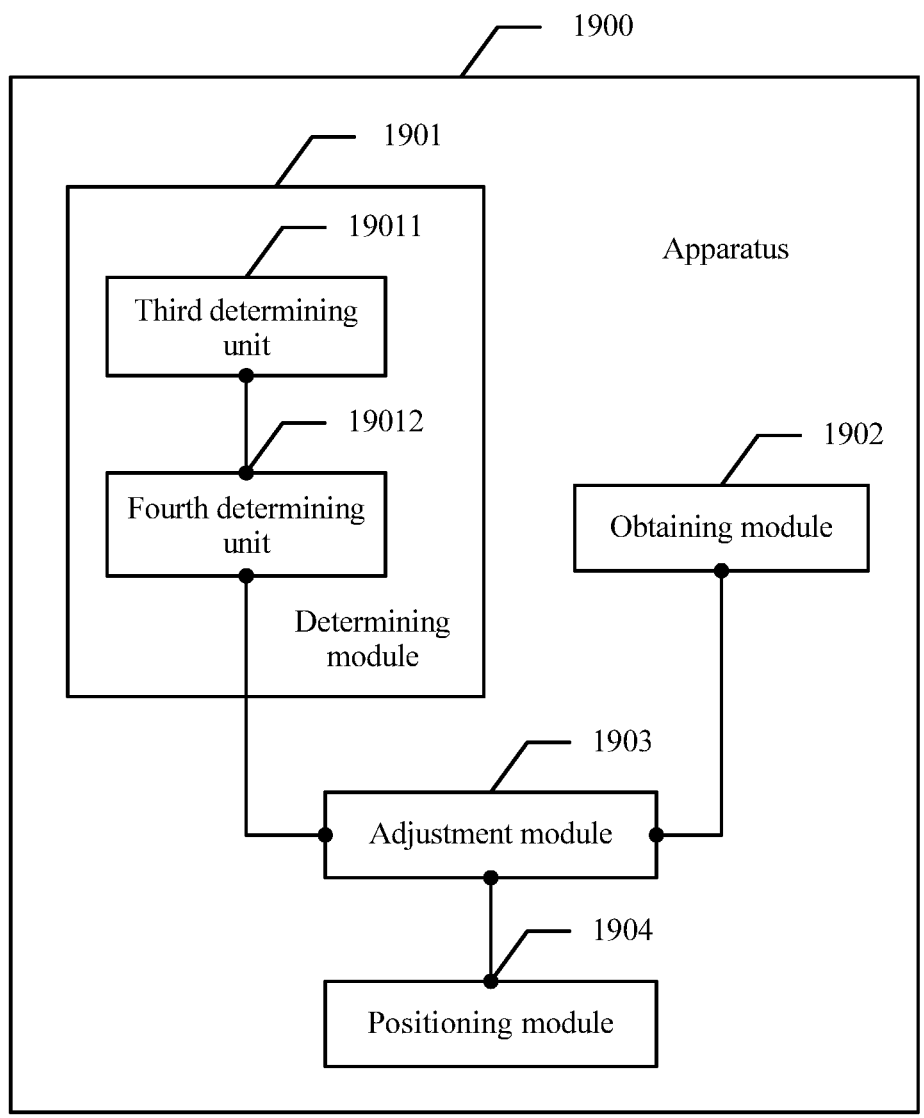
FIG. 19 is another schematic structural diagram of an apparatus according to an embodiment of the present disclosure.

Referring to FIG. 19, that the user presets an expected journey in each positioning scenario and then the determining module performs matching is used as an example. Another embodiment of the apparatus 1900 in the embodiments of the present disclosure includes a determining module 1901 configured to determine an expected journey L, where the expected journey is an expected value of a distance traveled by the apparatus 1900 between two consecutive times of positioning, an obtaining module 1902 configured to obtain a speed value v of the apparatus, an adjustment module 1903 configured to adjust a positioning frequency according to the expected journey L determined by the determining module 1901 and the speed value v that is of the apparatus and obtained by the obtaining module 1902 such that a deviation of a distance traveled by the apparatus between two consecutive times of positioning performed by a positioning module 1904 according to an adjusted positioning frequency from the expected journey L is less than a specified threshold and the positioning module 1904 configured to perform positioning according to the positioning frequency adjusted by the adjustment module 1903.

In this embodiment, the determining module 1901 includes a third determining unit 19011 configured to determine a current positioning scenario, and a fourth determining unit 19012 configured to determine, according to a preset correspondence between a positioning scenario and an expected journey, the expected journey L corresponding to the current positioning scenario.

The positioning scenario includes a region in a specific range nearby a position of the apparatus during positioning. For example, the positioning scenario may be determined as a warehouse if the apparatus performs positioning in the warehouse, and the positioning scenario may be determined as a factory if the apparatus performs positioning in the factory. For another example, the positioning scenario may be determined as a city or a region including a road and a specific range around the road if positioning is performed on the road in the city. The apparatus 1900 may obtain a specific situation in a positioning scenario from an electronic map corresponding to the positioning scenario. The apparatus 1900 generally performs positioning in several fixed positioning scenarios, and the user may set preset expected journeys corresponding to the positioning scenarios in advance. For example, if an apparatus is used only in a warehouse and an office outside the warehouse, there are two positioning scenarios the warehouse and the office, and the user may separately set expected journeys for the two positioning scenarios. When the apparatus 1900 enters a positioning scenario, the third determining unit 19011 determines that the current positioning scenario is, for example, the warehouse, and then the fourth determining unit 19012 determines an expected journey that corresponds to the warehouse and set by the user.

In the foregoing embodiment, the determining module 1901 may automatically determine an expected journey according to a current positioning scenario, which avoids a case in which the user needs to enter an expected journey each time after positioning scenario switching, and promotes user experience.

Figure 20:
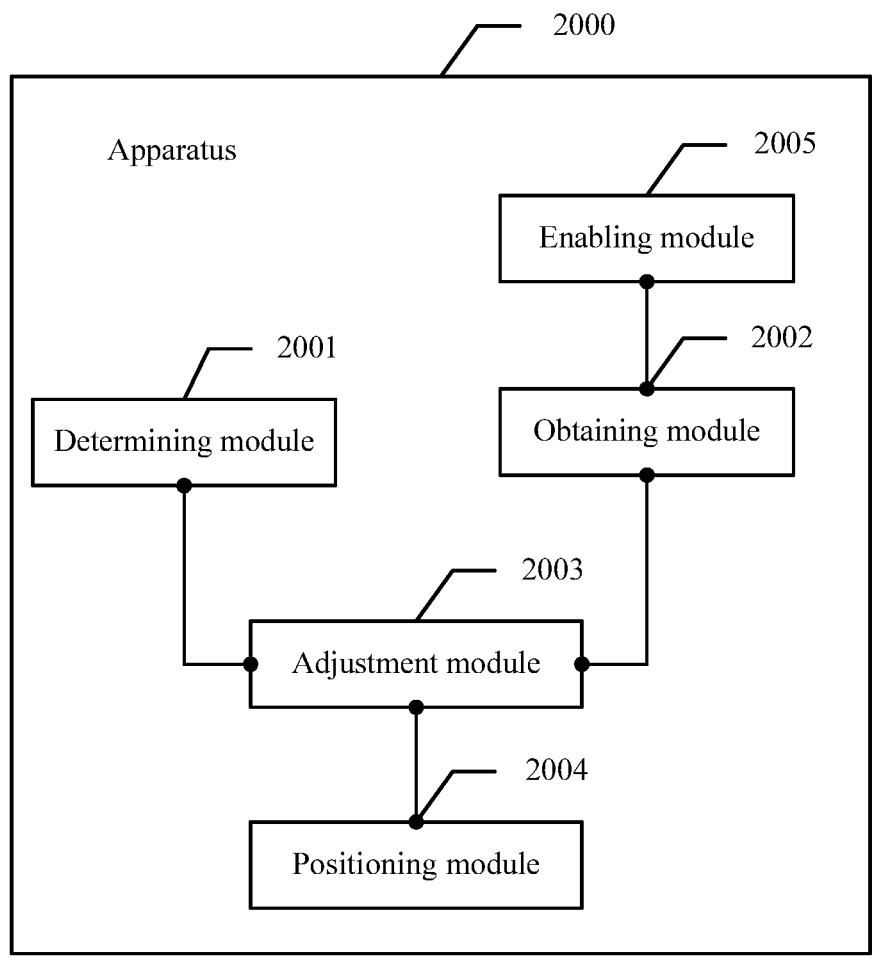
FIG. 20 is another schematic structural diagram of an apparatus according to an embodiment of the present disclosure.

The foregoing embodiments shown in FIG. 18 and FIG. 19 separately describe that the determining module may determine the expected journey in different manners. The foregoing embodiments shown in FIG. 15, FIG. 16, and FIG. 17 separately describe that the adjustment module may adjust the positioning frequency in different manners such that the deviation of the distance traveled by apparatus between the two consecutive times of positioning from the expected journey L is less than the specified threshold. In actual application, the apparatus may perform another adjustment on the positioning frequency according to different situations of the obtained speed value v of the apparatus. Referring to FIG. 20, another embodiment of the apparatus 2000 in the embodiments of the present disclosure includes a determining module 2001 configured to determine an expected journey L, where the expected journey is an expected value of a distance traveled by the apparatus between two consecutive times of positioning, an obtaining module 2002 configured to obtain a speed value v of the obtaining module, an adjustment module 2003 configured to adjust a positioning frequency according to the expected journey L determined by the determining module 2001 and the speed value v that is of the apparatus and obtained by the obtaining module 2002 such that a deviation of a distance traveled by the apparatus between two consecutive times of positioning performed by a positioning module 2004 according to an adjusted positioning frequency from the expected journey L is less than a specified threshold and the positioning module 2004 configured to perform positioning according to the positioning frequency adjusted by the adjustment module 2003.

In this embodiment, the adjustment module 2003 is further configured to adjust the positioning frequency according to the expected journey L determined by the determining module 2001 and the speed value v that is of the apparatus 2000 and obtained by the obtaining module 2002 when the speed value v of the apparatus 2000 is not equal to 0 such that the deviation of the distance traveled by the apparatus between the two consecutive times of positioning performed by the positioning module 2004 according to the adjusted positioning frequency from the expected journey L is less than the specified threshold.

The adjustment module 2003 is further configured to adjust the positioning frequency to 0 when the speed value of the apparatus is equal to 0.

Considering that the apparatus 2000 cannot obtain a speed value of the apparatus 2000 because of a failure of positioning caused by a fault of a speed measurement component of the apparatus 2000, a speed loss, or the like, the adjustment module 2003 may be further configured to adjust the positioning frequency to a fixed positioning frequency when the speed value v of the apparatus 2000 cannot be obtained.

Further, the adjustment module 2003 adjusts the positioning frequency to 0 when the speed value of the apparatus 2000 is equal to 0. However, if the apparatus 2000 keeps still after enabling positioning, the apparatus 2000 enters a low energy mode and does not perform positioning. In this case, a position of the apparatus 2000 cannot be learned, and therefore a positioning operation needs to be directly performed after a positioning function is enabled. The apparatus 2000 further includes an enabling module 2005 configured to directly trigger a positioning operation after enabling a positioning function.

In this embodiment, the apparatus 2000 adjusts the positioning frequency using different principles according to different situations of the speed value of the apparatus 2000. There may be four positioning modes by classification, namely, a startup mode, a variable-frequency positioning mode, a low energy mode, and a fixed-frequency positioning mode.

The startup mode is executed by the enabling module 2005. A positioning operation is forcibly triggered when the positioning function is enabled.

The following three positioning modes all are executed by the adjustment module 2003. Switching is performed between the three modes according to different situations of the speed value of the apparatus 2000, and the positioning frequency is adjusted according to the three modes.

In the variable-frequency positioning mode, a positioning frequency is adjusted when a speed value of the apparatus 2000 is not 0 such that a deviation of a distance traveled by the mobile terminal between two consecutive times of positioning performed according to an adjusted positioning frequency from an expected journey L is less than a specified threshold.

In the low energy mode, a positioning frequency is adjusted to 0 when a speed value of the apparatus 2000 is 0.

In the fixed-frequency positioning mode, a positioning frequency is adjusted to a preset fixed positioning frequency when the speed value of the apparatus 2000 cannot be obtained.

Optionally, before the obtaining module 2002 obtains the speed value v of the apparatus 2000, the apparatus 2000 may further receive a first delay time $T_{sw1}$, a second delay time $T_{sw2}$, and a third delay time $T_{sw3}$ that are set by a user.

The first delay time $T_{sw1}$ is a delay time for determining, by the adjustment module 2003, whether to execute the variable-frequency positioning mode.

The adjustment module 2003 executes the variable-frequency positioning mode when the speed value v of the apparatus 2000 is not equal to 0 and duration is greater than the first delay time $T_{sw1}$.

The second delay time $T_{sw2}$ is a delay time for determining, by the adjustment module 2003, whether to execute the low energy mode.

The adjustment module 2003 executes the low energy mode when the speed value of the apparatus 2000 is equal to 0 and duration is greater than the second delay time $T_{sw2}$.

The third delay time $T_{sw3}$ is a delay time for determining, by the adjustment module 2003, whether to execute the fixed-frequency positioning mode.

The adjustment module 2003 executes the fixed-frequency positioning mode when the speed value v of the apparatus 2000 is not obtained by the obtaining module 2002 and duration is greater than the third delay time $T_{sw3}$.

There is a delay time for determining before the adjustment module 2003 switches to each positioning mode such that a misoperation can be effectively avoided, and status switching is more stable.

In this embodiment, adjusting a positioning frequency by the apparatus 2000 according to different situations of an obtained speed value v of the apparatus 2000 is described with reference to the embodiment shown in FIG. 20. To avoid repetition, various manners for adjusting a positioning frequency by the adjustment module 2003 and determining an expected journey L by the determining module 2001 are not repeatedly described. However, it may be understood that both various manners for determining an expected journey L by the determining module in the embodiments shown in FIG. 18 and FIG. 19 and various manners for adjusting a positioning frequency by the adjustment module in the embodiments shown in FIG. 15, FIG. 16, and FIG. 17 may be applied to the apparatus 2000 in this embodiment.

Figure 21:
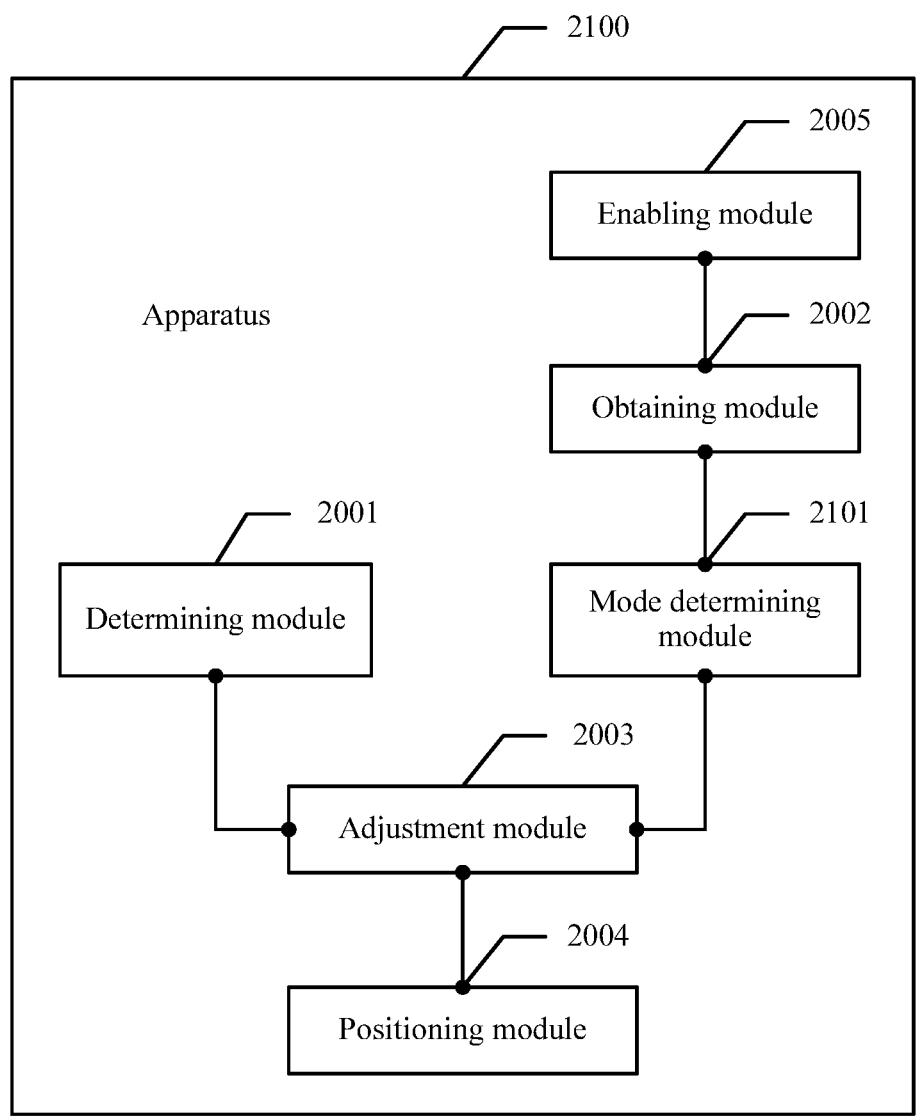
FIG. 21 is another schematic structural diagram of an apparatus according to an embodiment of the present disclosure.

In the foregoing embodiment, the adjustment module 2003 enters different positioning modes according to different situations of the speed value v of the apparatus 2000. Optionally, in actual application, referring to FIG. 21, the apparatus 2100 may include a mode determining module 2101 in addition to modules shown in apparatus 2000 in FIG. 20. The mode determining module 2101 configured to instruct the adjustment module 2003 to enter a corresponding positioning mode according to different situations of a speed value that is of the apparatus 2100 and obtained by the obtaining module 2002.

For ease of understanding the foregoing embodiments, the following describes an interaction process of the modules of the foregoing apparatus 2100 in a specific application scenario.

The apparatus 2100 may be a mobile terminal. Before a positioning function is enabled, a determining module 2001 may receive an expected journey L (for example, 10 meters) that is set by a user. The apparatus may further receive a fixed time interval $T_{fix}$ (for example, 2 seconds) used in a fixed-frequency positioning mode, a first delay time $T_{sw1}$ (for example, 500 milliseconds) used to determine whether to enter a variable-frequency positioning mode, a second delay time $T_{sw2}$ (for example, 600 milliseconds) used to determine whether to enter a low energy mode, a third delay time $T_{sw3}$ (for example, 700 milliseconds) used to determine whether to enter the fixed-frequency positioning mode, and a minimum time interval $T_{min}$ (for example, 1 second) that are set by the user.

When the user enables the positioning function, an enabling module 2005 enters a startup mode, and a positioning module 2004 triggers a positioning operation and performs positioning in a wireless positioning manner. In a network-centric positioning system, the mobile terminal may broadcast a wireless signal once to perform positioning. In a mobile terminal-centric positioning system, the mobile terminal may receive the latest wireless signal sent by a nearby infrastructure locator to perform positioning.

After performing one time of positioning, the obtaining module 2002 obtains a speed value v of the mobile terminal. An obtaining manner may be obtaining a speed value measured by each sensor (such as an acceleration sensor) or a speedometer that is mounted on the mobile terminal.

If the obtained speed value v of the mobile terminal is 0, and duration is greater than the second delay time $T_{sw2}$ of 600 milliseconds, the adjustment module 2003 enters the low energy mode and adjusts a positioning frequency to 0. If the speed value v of the mobile terminal can be obtained, and v is always 0, the adjustment module 2003 keeps in the low energy mode, and continuously obtains v until the positioning function is disabled or v changes.

When the obtained speed value v of the mobile terminal is not 0 (for example, is 2 m/s) and duration is greater than the first delay time $T_{sw1}$ of 500 milliseconds, the adjustment module 2003 enters a variable-frequency positioning mode. In this mode, the adjustment module 2003 may adjust the positioning frequency in two manners, where manner 1 includes triggering, by the mobile terminal, a positioning operation after 5 seconds if the mobile terminal obtains a time interval T of 5 seconds by means of calculation according to a formula T=L/v, where the time interval T of 5 seconds is greater than the minimum time interval of 1 second, and manner 2 includes continuously obtaining a speed v, performing integration on the speed v in terms of time, and triggering a positioning operation when a deviation of a traveled distance L' that is of the mobile terminal and obtained by means of integration over 5 seconds from an expected journey L is less than a preset threshold of 0.1 meters. After the positioning operation is triggered, the positioning module 2004 performs positioning in a wireless positioning manner that may include that in the network-centric positioning system, the mobile terminal broadcasts a wireless signal once after 5 seconds. A nearby infrastructure locator device receives the wireless signal of the mobile terminal, extracts an address or an ID of the mobile terminal, measures a related physical quantity such as an RSSI or an AOA, and sends the address or the ID of the mobile terminal and the physical quantity to a server together with related information such as an address or an ID of the locator device, and the server calculates a coordinate value of the mobile terminal, or in the mobile terminal-centric positioning system, the mobile terminal receives, after 5 seconds, the latest wireless signal sent by an infrastructure locator, and calculates a coordinate value of the mobile terminal according to related information of the infrastructure locator.

In the variable-frequency positioning mode, if the obtaining module 2002 obtains another speed value v of 4 m/s of the mobile terminal after the positioning module 2004 performs a positioning operation according to a positioning frequency adjusted by the adjustment module 2003, and duration is greater than the first delay time $T_{sw1}$ of 500 milliseconds, the adjustment module 2003 keeps the mobile terminal in the variable-frequency positioning mode. If a time interval T of 2.5 seconds is obtained by means of calculation according to a formula T=L/v, and the time interval of 2.5 seconds is greater than the minimum time interval of 1 second, the positioning module 2004 triggers a positioning operation after 2.5 seconds, and performs positioning in a wireless positioning manner. If no wireless signal is detected in this case, the mobile terminal may perform one time of positioning in an inertial navigation positioning manner.

When the obtaining module 2002 cannot obtain the speed value v of the mobile terminal because of a fault of a speed measurement component of the mobile terminal or a speed loss, and duration is greater than the third delay time $T_{sw3}$ of 700 milliseconds, the adjustment module 2003 enters the fixed-frequency positioning mode, and triggers the positioning module 2004 to perform a positioning operation every 2 seconds according to the fixed time interval $T_{fix}$ of 2 seconds.

As such, the adjustment module 2003 switches between the variable-frequency positioning mode, the low energy mode, and the fixed-frequency positioning mode according to a situation of the obtained speed value v of the mobile terminal.

It may be understood that the apparatus in the each of the foregoing embodiments may be a mobile terminal, or may be any another device that can use the positioning method in the present disclosure, which is not limited herein.

Figure 22:
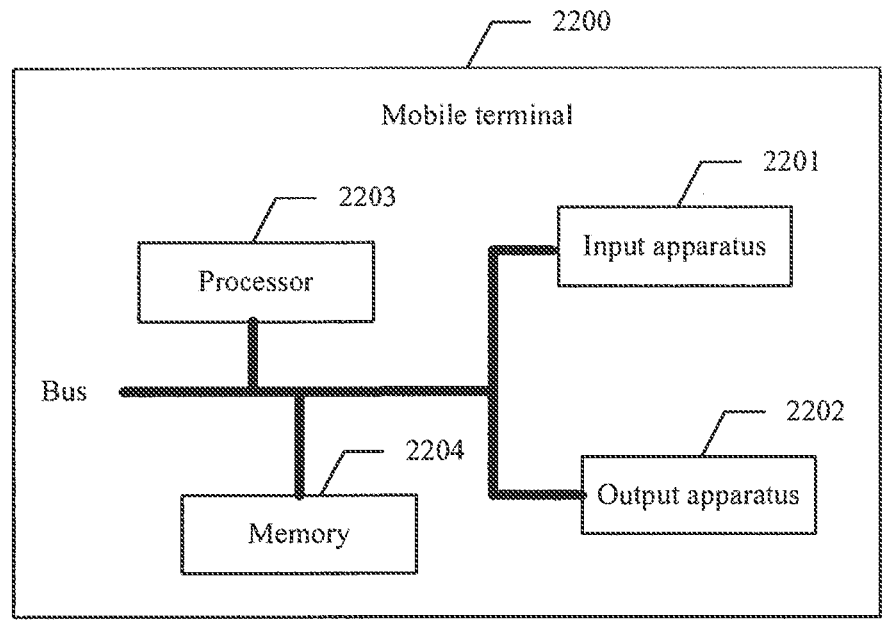
FIG. 22 is another schematic structural diagram of a mobile terminal according to an embodiment of the present disclosure.

The foregoing describes the apparatus in the embodiments of the present disclosure used to execute the embodiments of the present disclosure from a perspective of a unitized functional entity. The following describes the mobile terminal in the embodiments of the present disclosure from a perspective of hardware processing. Referring to FIG. 22, another embodiment of a mobile terminal 2200 in the embodiments of the present disclosure includes an input apparatus 2201, an output apparatus 2202, a processor 2203, and a memory 2204 (there may be one or more processors 2203 in the mobile terminal 2200, and one processor 2203 is used as an example in FIG. 22). In some embodiments of the present disclosure, the input apparatus 2201, the output apparatus 2202, the processor 2203, and the memory 2204 may be connected using a bus or in another manner. In FIG. 22, a bus connection is used as an example.

The mobile terminal 2200 further includes a speed measurement component configured to detect a speed value of the mobile terminal.

The input apparatus 2201 may obtain the speed value of the mobile terminal 2200 according to an instruction of the processor 2203, and may further receive a parameter that is input by a user.

The output apparatus 2202 may display a positioning effect to the user.

By invoking an operation instruction stored in the memory 2204, the processor 2203 is configured to perform the steps of determining an expected journey L, where the expected journey is an expected value of a distance traveled by the mobile terminal 2200 between two consecutive times of positioning, obtaining a speed value v of the mobile terminal 2200, adjusting a positioning frequency according to the expected journey L and the speed value v of the mobile terminal 2200 such that a deviation of a distance traveled by the mobile terminal 2200 between two consecutive times of positioning performed by the mobile terminal 2200 according to an adjusted positioning frequency from the expected journey L is less than a specified threshold, and performing positioning according to the adjusted positioning frequency.

In some embodiments of the present disclosure, when performing the step of adjusting a positioning frequency according to the expected journey L and the speed value v of the mobile terminal 2200, the processor 2203 further performs the step of obtaining a second positioning time t of the mobile terminal 2200 according to the expected journey L and the speed value v of the mobile terminal when triggering a first positioning operation, and when performing the step of performing positioning according to the adjusted positioning frequency, the processor 2203 further performs the step of triggering a second positioning operation at the second positioning time t.

In some embodiments of the present disclosure, when performing the step of obtaining a second positioning time t of the mobile terminal 2200 according to the expected journey L and the speed value v of the mobile terminal, the processor 2203 further performs the following steps: obtaining a time interval T according to the formula T=L/v, that is, the time interval T is equal to a ratio of the expected journey L to the speed value v of the mobile terminal 2200, and determining the second positioning time t of the mobile terminal 2200 as a sum value of a current moment determined by the mobile terminal 2200 and the time interval T.

In some embodiments of the present disclosure, when performing the step of adjusting a positioning frequency according to the expected journey L and the speed value v of the mobile terminal 2200, the processor 2203 further performs the steps of obtaining a traveled distance L' of the mobile terminal 2200 by performing integration on the speed value v of the mobile terminal in terms of time starting from a time point at which a first positioning operation is triggered, and adjusting the positioning frequency according to the traveled distance L' and the expected journey L.

In some embodiments of the present disclosure, when performing the step of determining an expected journey L, the processor 2203 further performs the steps of obtaining a positioning error R and lengths of closed paths that surround all unreachable regions in a positioning scenario, determining a value range of the expected journey L as $2R<L<(C/2)$ when a minimum closed path length C is greater than 4R, or determining a value range of the expected journey L as $2R<L<(C_1/2)$ when a minimum closed path length C is not greater than 4R, where $C_1$ is a minimum closed path length greater than 4R, and receiving an expected journey L selected by a user from the value range of the expected journey L.

In some embodiments of the present disclosure, when performing the step of determining an expected journey L, the processor 2203 further performs the steps of determining a current positioning scenario, and determining, according to a preset correspondence between a positioning scenario and an expected journey, the expected journey L corresponding to the current positioning scenario.

In some embodiments of the present disclosure, when performing the step of adjusting a positioning frequency according to the expected journey L and the speed value v of the mobile terminal 2200, the processor 2203 further performs the step of adjusting, by the mobile terminal, the positioning frequency according to the expected journey L and the speed value v of the mobile terminal 2200 when the speed value v of the mobile terminal is not equal to 0, or adjusting the positioning frequency to 0 when the speed value of the mobile terminal 2200 is equal to 0.

In some embodiments of the present disclosure, before performing the step of obtaining a speed value v of the mobile terminal 2200, the processor 2203 is further configured to perform the step of triggering a positioning operation.

In some embodiments of the present disclosure, the processor 2203 is further configured to perform the step of adjusting the positioning frequency to a preset fixed positioning frequency when the speed value v of the mobile terminal cannot be obtained.

The foregoing describes the mobile terminal 2200 in the embodiments of the present disclosure. In actual application, the mobile terminal 2200 may be in different forms. The modules of the foregoing mobile terminal 2200 may be implemented using software, or may be implemented using hardware. In addition to division of the foregoing modules and units, there may be another division manner in actual implementation. For example, multiple units or modules may be combined or may be integrated into another system. The following describes the mobile terminal 2200 in the embodiments of the present disclosure with reference to several different application scenarios.

Manner I: The following describes an application scenario in which the mobile terminal 2200 is a wireless tag when the mobile terminal uses a wireless positioning manner and is located in a wireless positioning system.

Figure 23:
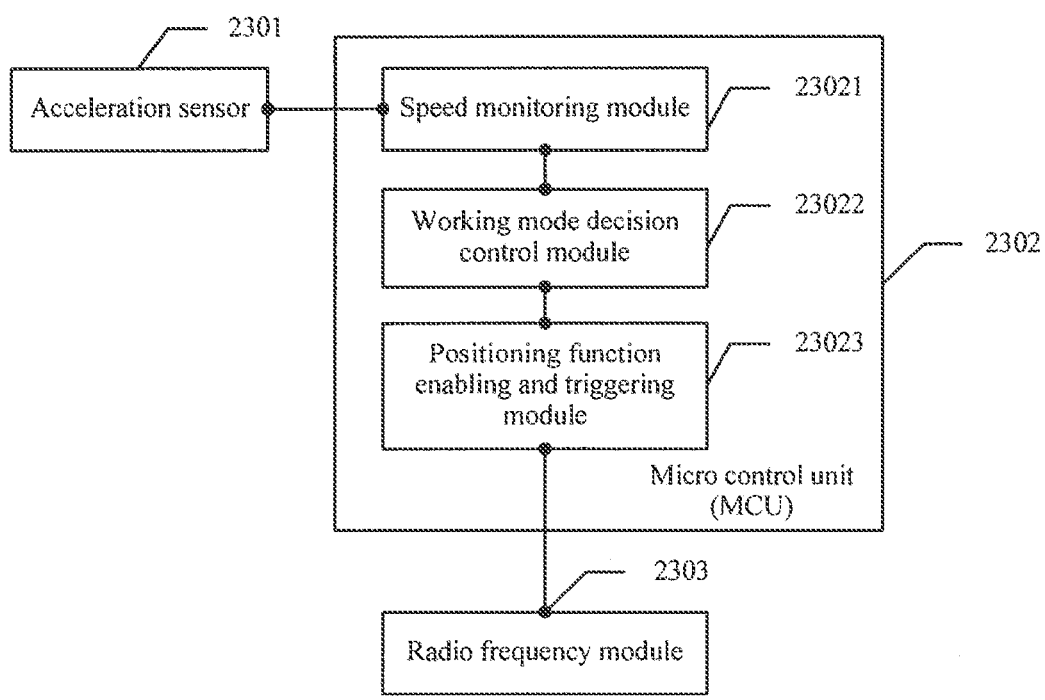
FIG. 23 is a schematic structural diagram of a wireless tag according to an embodiment of the present disclosure.

FIG. 23 shows a schematic structural diagram of a wireless tag. The wireless tag is integrated with an acceleration sensor 2301 used as a speed source of the mobile terminal, a micro control unit (MCU) 2302 (MCU) configured to control the mobile terminal to switch between multiple positioning modes and configured to trigger positioning, and a radio frequency module 2303 configured to transmit a wireless signal to perform positioning, and may further have an assorted power supply and management circuit, a push-button, and another functional unit.

The MCU 2302 may include, using software, a speed monitoring module 23021, a working mode decision control module 23022, a positioning function enabling and triggering module 23023, and may further have another assorted signal processing module (not shown), speed estimation module (not shown), and functional module such as push-button detection or parameter configuration (not shown). In addition to completing functions of signal processing, speed calculation, and decision control, the MCU 2302 may further detect a push-button action, and implement switching between wireless positioning and parameter configuration.

The speed monitoring module 23021 may obtain information about the acceleration sensor 2301, and extract a speed value of the mobile terminal 2200 after processing the information.

The working mode decision control module 23022 may select a working mode from a startup mode, a low energy mode, a variable-frequency positioning mode, and a fixed-frequency positioning mode according to a situation of the speed value that is of the mobile terminal and obtained by the speed monitoring module 23021.

The positioning function enabling and triggering module 23023 may send, according to the working mode selected by the working mode decision control module 23022, a control instruction to control the radio frequency module 2303 to transmit a wireless signal to perform positioning.

The radio frequency module 2303 performs a positioning operation according to the control instruction sent by the positioning function enabling and triggering module 23023. BLE may be selected as a wireless technology of the radio frequency module 2303, and a nearby disposed locator receives a BLE signal to implement positioning.

Parameter configuration needs to be performed before wireless positioning. There are many parameter configuration solutions. In a solution 1, the wireless tag is powered on using the push-button and enters a parameter configuration mode. In this case, the wireless module is used as a secondary device and is in a connectable state. A smartphone with a protocol earlier than the BLUETOOTH BT4.0 is used to establish a connection to the wireless tag, and a parameter configuration function is implemented using an application. After parameter configuration is completed, the wireless tag is switched to a broadcast mode using the push-button in order to implement wireless positioning. In a solution 2, a universal serial bus (USB) port is reserved on the wireless tag, and parameter configuration and a software upgrade are performed by means of a wired connection.

During wireless positioning, after the wireless tag is powered on and is initialized, the working mode decision control module 23022 controls the wireless terminal to first enter a startup mode, and the working mode decision control module 23022 sends a command to the radio frequency module 2303 such that the radio frequency module 2303 broadcasts a data packet to implement initial positioning. The acceleration sensor 2301 starts to collect acceleration signals and transmits the acceleration signals to the MCU 2302.

The speed monitoring module 23021 in the MCU 2302 may include two parts, a signal processing module and a speed estimation module. A specific process of obtaining a speed value may include that the signal processing module first performs preprocessing such as filtering and noise reduction on an original acceleration signal, and transmits a processing result to the speed estimation module, and the speed estimation module estimates a current speed according to the received acceleration signal.

In some cases, a speed cannot be estimated when an acceleration signal is 0. Certainly, it is possible that a speed cannot be estimated upon booting or a speed value may be temporarily lost for another reason, and therefore the speed estimation module may output two aspects of information to the speed monitoring module 23021. One is speed estimation identifier information, and the other is an estimated current speed value.

The speed estimation module sends speed estimation failure identifier information to the speed monitoring module 23021 when having not successfully estimated a current speed. The speed monitoring module 23021 determines a relationship between a speed estimation failure time and a delay time for switching to each mode (for example, a first delay time, a second delay time, or a third delay time respectively for determining whether to enter a variable-frequency positioning mode, a low energy mode, or a fixed-frequency positioning mode), and notifies the working mode decision control module 23022 of the relationship. The working mode decision control module 23022 determines, according to a result (that the current speed cannot be obtained) obtained by the speed monitoring module 23021, to switch to the fixed-frequency positioning mode to broadcast a signal to the outside, or to continuously keep in the fixed-frequency positioning mode, and instructs the radio frequency module 2303 to work in the state.

After obtaining the current speed by means of estimation, the speed estimation module sends both speed estimation success identifier information and the estimated current speed value to the speed monitoring module 23021. The speed monitoring module 23021 analyzes a change of the current speed value, and notifies the working mode decision control module 23022 of an analysis result. The decision module determines, according to a speed monitoring result, to enter the low energy mode or the variable-frequency positioning mode, or keep in an original state. In a specific process, processing is performed according to the procedure of the positioning method shown in FIG. 8.

The radio frequency module 2303 of the wireless module may be selected from various optional BLE single-mode chips such as a system on chip (SOC) CC2540 that is of an integrated enhanced 8051 MCU and launched by the TEXAS INSTRUMENTS company. If no more software support and data processing is required, all functions of the speed monitoring module 23021, the working mode decision control module 23022, and the positioning function enabling and triggering module 23023 that are in the foregoing MCU 2302 can be integrated into the BLE chip, and the acceleration sensor is directly connected to the BLE chip in order to reduce costs and simplify a software and hardware design. Certainly, if a resource of the BLE chip cannot meet more peripheral support and data processing services required by an application, the structure shown in FIG. 23 may also be selected for use, and an external MCU is used as a main control unit to connect to the acceleration sensor, the BLE chip, and another peripheral device.

It may be understood that the mobile terminal in the present disclosure may include any mobile device with a speed measurement and wireless broadcast function, and a specific form of the mobile terminal is not limited. For example, the mobile terminal may be a vehicle, or is a positioning apparatus mounted on a vehicle, which is not limited herein.

Manner II: The following uses an example in which the mobile terminal 2200 is a vehicle running in an indoor environment (for example, a vehicle in an enclosed parking lot and an operation vehicle in a workshop), and uses positioning of the vehicle running in the indoor environment as another application scenario of the mobile terminal for description.

Figure 24:
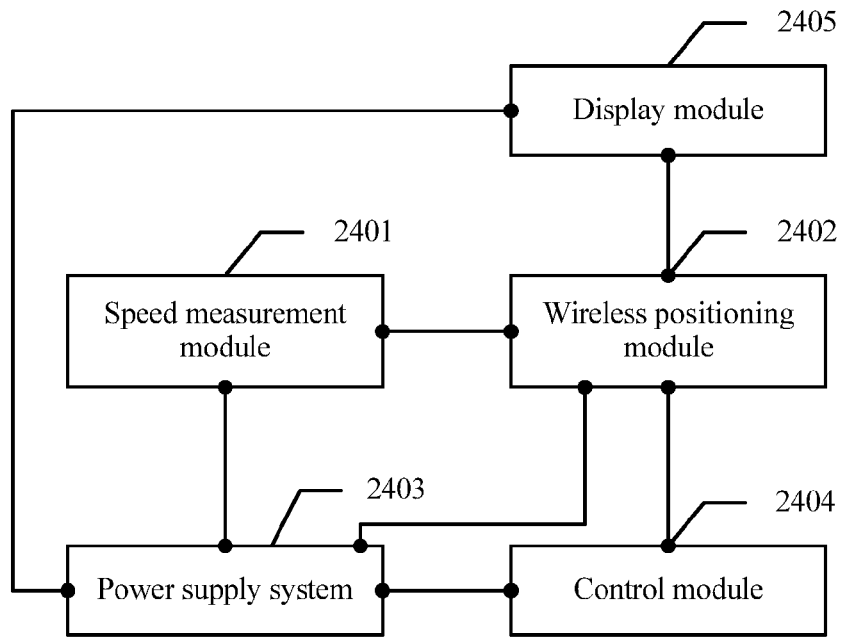
FIG. 24 is a schematic structural diagram of a vehicle positioning system according to an embodiment of the present disclosure.

FIG. 24 shows a schematic architectural diagram of a positioning system of a vehicle. The vehicle may include a speed measurement module 2401 and a wireless positioning module 2402, and in addition, further includes a power supply system 2403 and control module 2404 and a display module 2405.

The speed measurement module 2401 is responsible for measuring a running speed of the vehicle, and sending a measurement result to the wireless positioning module 2402.

The wireless positioning module 2402 dynamically adjusts a wireless positioning working mode according to the output result of the speed measurement module 2401.

The control module 2404 is configured to allow a user to control power on/off and restarting of the wireless positioning module 2402.

The display module 2405 is configured to display a working state of the wireless positioning module 2402, and includes a power on/off indication of the wireless positioning module 2402 and a broadcast indication of the wireless positioning module 2402.

The power supply system 2403 supplies power to the foregoing four functional modules. A power supply manner may be flexibly selected according to a specific situation. Different power sources may be used for separate power supply or a single power source may be used for centralized power supply.

There may be many specific implementation methods of each functional module. The following selects several methods for description In terms of the speed measurement module 2401, most vehicles have a vehicle speed measurement instrument and meter. For a vehicle originally having no vehicle speed measurement apparatus, a vehicle speed measurement sensor such as a vehicle speed sensor of a photoelectric type, a magnetoelectric type, a Hall type, or the like may be mounted at a proper position during deployment of a positioning system. A type of the vehicle speed measurement sensor is flexibly selected according to costs and a performance requirement.

Figure 25:
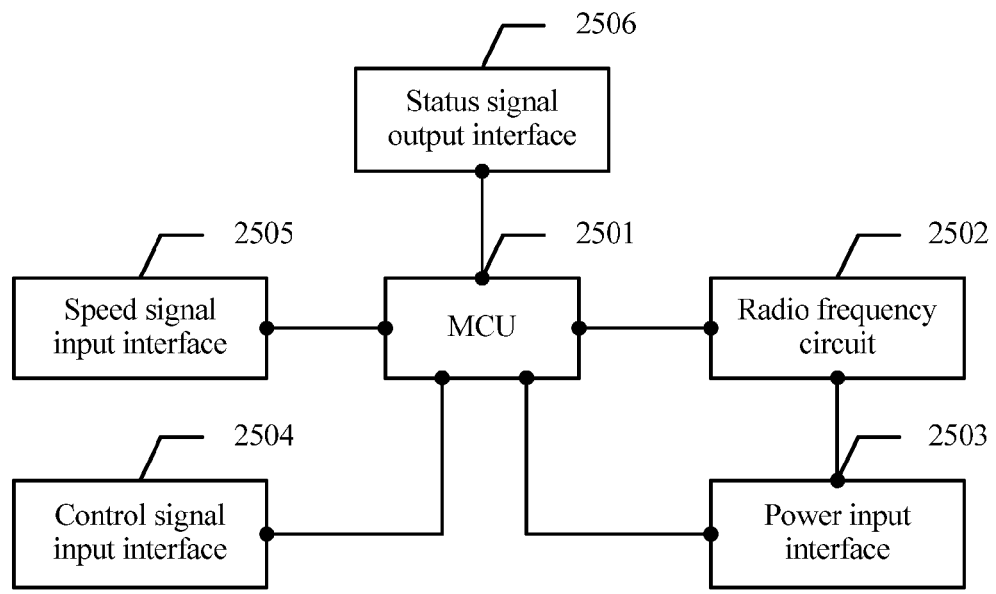
FIG. 25 is a schematic structural diagram of a wireless positioning module according to an embodiment of the present disclosure.

In terms of the wireless positioning module 2402, because a locator device that receives a wireless positioning signal is generally mounted on a ceiling or an indoor top, it is also suitable to mount the wireless positioning module 2402 on the top of the vehicle in order to reduce signal shielding or attenuation in a process of broadcasting a wireless signal to the locator device. Various wireless technologies are available, but BLE wireless positioning is still used as an example herein. FIG. 25 shows a schematic structural diagram of an optional wireless positioning module. The wireless positioning module mainly includes an MCU 2501, a radio frequency circuit 2502, a power input interface 2503, a control signal input interface 2504, a speed signal input interface 2505, and a status signal output interface 2506. The MCU 2501 is responsible for processing and analyzing a vehicle speed signal, and dynamically controlling a wireless positioning working mode. The radio frequency circuit 2502 broadcasts a BLE wireless signal according to an instruction sent by the MCU 2501. The power input interface 2503 is configured to input an external power signal, and supply power to the wireless positioning module after the interface performs conditioning and matching between a voltage and a current. The control signal input interface 2504 is configured to receive, from the outside, a control signal of power on/off and restarting of the wireless positioning module. The speed signal input interface 2505 is configured to receive a vehicle speed signal from the outside, and input, into an input/output (I/O) port, an electrical parameter obtained after matching by a conditioning circuit. The status signal output interface 2506 is configured to output two status indication signals of the wireless positioning module. One signal provides a power on/off indication of the wireless positioning module, and the other signal provides a wireless signal broadcast positioning indication, that is, one transition is output each time a data packet is broadcast using a wireless signal.

The control module 2404 in FIG. 24 may be a button or a switch that is disposed on a meter panel of the vehicle, or may be implemented in a touchscreen manner. In daily use of the vehicle, an indoor positioning function may need to be used or may not need to be used temporarily. However, a speed measurement function is generally always a necessary function of the vehicle. Therefore, an interface for controlling power on/off of the wireless positioning module 2402 in FIG. 24 needs to be separately disposed in order to control enabling and disabling of the wireless positioning function using a control button or switch. A restart button or the switch is used to restart the wireless positioning module 2404 in a program suspension situation or the like.

In terms of the display module 2405 in FIG. 24, the display module 2405 provides two indications, power on/off of the wireless positioning module 2402 and a wireless broadcast state. Each time when the wireless positioning module 2402 broadcasts a data packet, the display module 2405 provides one broadcast indication. The display module 2405 has various forms, and may be a display screen or may be a light.

In terms of the power supply module 2403, some vehicles originally have a power supply, and may connect a power cable to each module to supply power.

Parameter configuration needs to be first performed before the positioning function is used. The wireless positioning module 2402 may be switched to a connectable peripheral state using a control button. An intelligent terminal application (such as a mobile phone) used for parameter configuration is developed and the application is opened in order to start an intelligent terminal BLUETOOTH module to connect to the wireless positioning module 2402 to configure parameters such as an expected journey, a minimum time interval, a fixed time interval, and a delay time into the wireless positioning module 2402 for storage. After configuration, the wireless positioning module 2402 is switched back to the broadcast state again using the control button. A data port of parameter configuration may also be designed in the control module, the port is connected using a personal computer (PC), and parameter configuration is performed on the wireless positioning module 2402 using PC software.

The following describes an entire working procedure of vehicle positioning.

When not using the positioning function, a user separately powers the wireless positioning module 2402 off using a power off switch of the control module 2404 in order to reduce system power consumption.

When using the positioning function, the user enables the wireless positioning module 2402 using a power on switch. After being powered on, the wireless positioning module 2402 first detects whether the speed measurement module 2401 sends a speed signal and analyzes a speed change, and always detects and analyzes a speed signal in the entire positioning process, controls a working mode of the wireless positioning module 2402 online according to a detection and analysis result, and broadcasts a data packet used for initial positioning at the same time such that a nearby locator device receives the data packet to complete the initial positioning.

If the wireless positioning module 2402 does not receive a speed signal sent by the speed measurement module 2401, and duration with no speed signal received is greater than the third delay time, the wireless positioning module works on the fixed-frequency positioning mode, and a time interval between two consecutive times of broadcasting is the fixed time interval $T_{fix}$.

If the wireless positioning module 2402 receives a speed signal sent by the speed measurement module 2401, but a speed value is equal to 0, and duration with the speed value continuously being equal to 0 is greater than the second delay time, the wireless positioning module 2402 stops broadcasting a data packet and enters the low energy mode.

If the wireless positioning module 2402 receives a speed signal sent by the speed measurement module 2401, and duration with the speed value continuously being not 0 is greater than the first delay time, the wireless positioning module enters the variable-frequency positioning mode. In this mode, after the wireless positioning module 2402 completes a previous time of broadcasting, the wireless positioning module 2402 calculates a ratio T=L/v of an expected journey L to a current speed v, and determines a next wireless broadcasting time $t_{(i+1)}$ according to the following formula:

$$t_{(i+1)} = t_{(i)} + \max(T_{(i)}, T_{min}),$$

where $t_{(i+1)}$ is a next broadcasting time, $t_{(i)}$ is a previous broadcasting time, $T_{(i)}$ is a time interval obtained by means of calculation, $T_{min}$ is a minimum time interval, and $\max(T_{(i)}, T_{min})$ indicates selecting a larger value between the $T_{(i)}$ and $T_{min}$.

The wireless positioning module 2402 keeps in an original state when one of the following cases occurs.

(1) A speed signal received by the wireless positioning module 2402 when the wireless positioning module 2402 broadcasts a data packet is not 0, but duration is less than the first delay time;

(2) A speed signal received by the wireless positioning module 2402 when the wireless positioning module 2402 broadcasts a data packet is 0, but duration is less than the second delay time; or (3) The wireless positioning module 2402 cannot obtain a speed signal when broadcasting a data packet, but duration is less than the third delay time.

Both the foregoing application scenarios are in a network-centric wireless positioning system. The mobile terminal may further be applied to a wireless mobile terminal-centric positioning system.

Manner III: The following describes an application scenario in which the mobile terminal works in the wireless mobile terminal-centric positioning system.

In the mobile terminal-centric positioning system, an infrastructure locator periodically broadcasts a wireless signal, and the mobile terminal receives the wireless signal to perform positioning calculation. Typical allocation scenarios include, a mobile terminal such as a smartphone and a tablet receives a wireless signal to perform positioning calculation and display a position such that a user learns a position at which the mobile terminal is located, and the mobile terminal performs positioning calculation, and controls a running status of the mobile terminal according to a positioning result. For example, a robot automatically performs navigation. The system mainly includes a locator device and a smartphone, and may further include a related device such as a server according to different system architectures.

In terms of the locator device, the locator device is required to broadcast a wireless signal in a fixed period, and a BLE wireless technology is still used as an example for description. In this case, the locator needs to work in a broadcast mode. The locator broadcasts a data packet including an address (or an ID or coordinates) of the locator device, a current broadcast frequency, and another positioning-required parameter. Generally, multiple locator devices need to be deployed to cover an entire positioning region (the locator can be flexibly deployed on an indoor ceiling, a wall, or the like).

In terms of the mobile terminal, the mobile terminal receives a data packet periodically broadcast by a nearby locator device, extracts a current broadcast frequency and related information used in positioning calculation such as an address (or an ID or coordinates) of the device and a wireless signal measurement value (such as an RSSI or an AOA), where the current broadcast frequency and related information are included in the data packet, and performs positioning calculation using the information in order to obtain positioning coordinates. With reference to different application scenarios, the mobile terminal may be an intelligent device such as a smartphone or a tablet, and this type of device has a display screen, and can display an indoor map and a position of the mobile terminal, for use in positioning and navigation by a user, or may be a mechanical device such as a robot, and controls a running status of the device using positioning coordinates in order to implement a specific application (such as automatic navigation).

Figure 26:
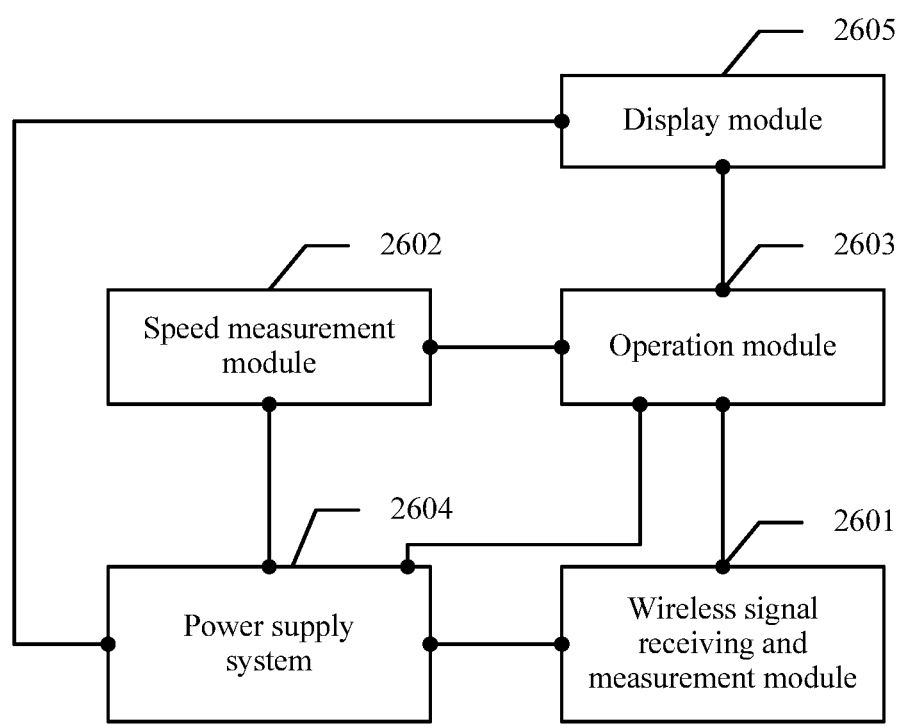
FIG. 26 is another schematic structural diagram of a mobile terminal according to an embodiment of the present disclosure.

FIG. 26 shows another schematic structural diagram of a mobile terminal. The mobile terminal mainly includes a wireless signal receiving and measurement module 2601, a speed measurement module 2602, an operation module 2603, and a power supply module 2604. If the mobile terminal belongs to a user positioning and navigation device such as a smartphone, the mobile terminal may further include a display module 2605, or the mobile terminal may further include an execution module (not shown) if the mobile terminal belongs to a device such as a navigation robot.

The wireless signal receiving and measurement module 2601 is responsible for receiving a data packet broadcast by the locator device, extracting a current broadcast frequency and the related information used in the foregoing positioning calculation, where the current broadcast frequency and the related information are included in the data packet, and sending the related information in the positioning calculation to the operation module 2603. The wireless signal receiving and measurement module 2601 may use different wireless technologies including BLE, WiFi, and the like. If a BLE technology is used, the module needs to work in an observer mode.

The speed measurement module 2602 is configured to measure a traveling speed of the mobile terminal. Various speed measurement methods are available to the mobile terminal. For example, a device such as a smartphone for positioning and navigation by a user may measure a speed using a built-in acceleration sensor, and various speed sensors such as a photoelectric speed sensor are available to a mechanical device such as a robot. In some cases, the mobile terminal may not include the speed measurement module 2602 originally. For example, if the mobile terminal does not have the speed measurement module, a portable wearable device that can measure a speed or another speed measurement device may be connected to the mobile terminal in a wireless connection manner such as by means of BLUETOOTH in order to transmit speed measurement data to the mobile terminal in real time.

The operation module 2603 is configured to receive output information of the wireless signal receiving and measurement module 2601 and the speed measurement module 2602. First calculate positioning coordinates according to the related information that is used in the positioning calculation and output by the wireless signal receiving and measurement module 2601, output a positioning result to the display module 2605, and control and decide a working mode according to speed information that is output by the speed measurement module 2602.

The display/execution module 2605 receives the positioning information that is output by the operation module 2603, and displays a position of the mobile terminal, or performs a related action based on the positioning information.

The power supply module 2604 is configured to supply power to the foregoing modules. A power supply manner may be separately supplying power using multiple power sources, or may be centrally supplying power using one power source.

Figure 27A:
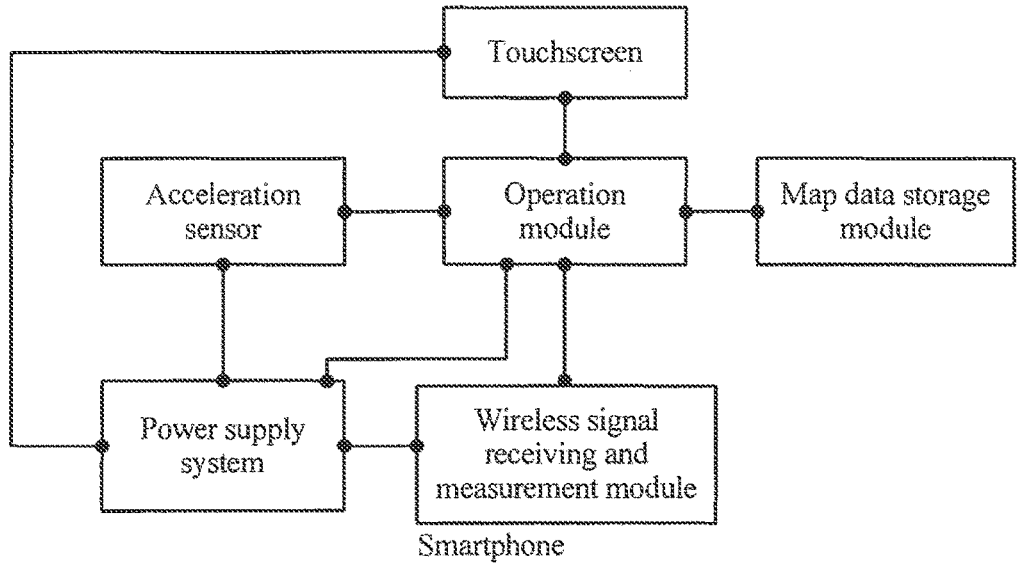
FIG. 27A is a schematic structural diagram of a smartphone according to an embodiment of the present disclosure.
Figure 27B:
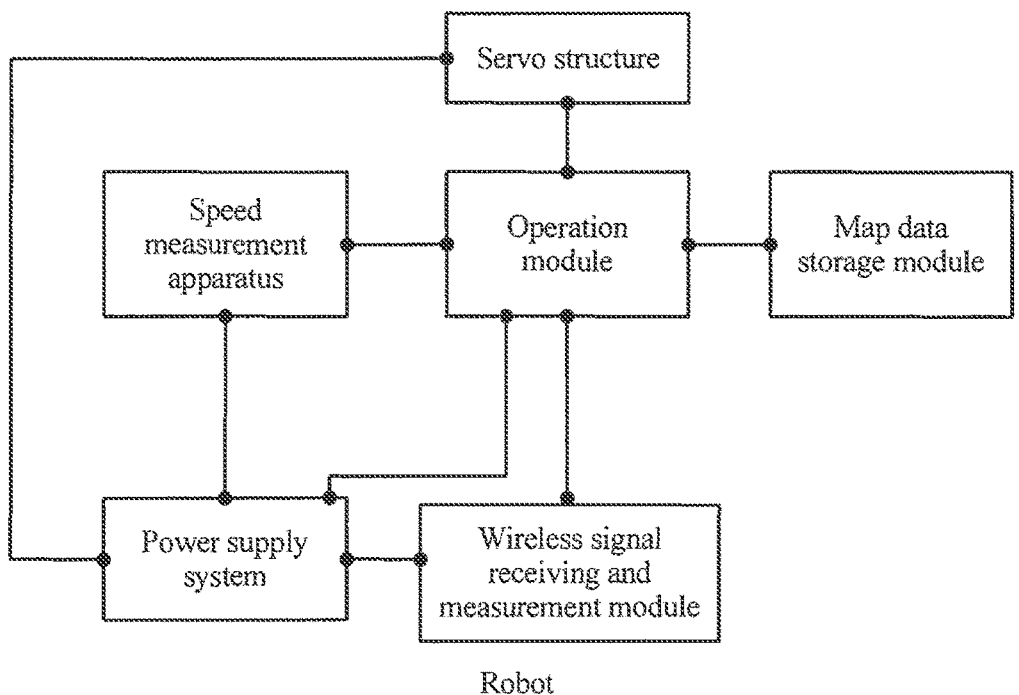
FIG. 27B is a schematic structural diagram of a robot according to an embodiment of the present disclosure.

In actual application, a specific structure of the mobile terminal may further be adjusted according to different application scenarios and different functions that need to implement. FIGS. 27A and 27B show a schematic structural diagram of mobile terminals of different types. FIG. 27A is used to represent a schematic structural diagram of a smartphone that may include a touchscreen, an acceleration sensor, an operation module, a wireless signal receiving and measurement module, a power supply system, and a map data storage module. FIG. 27B is used to represent a schematic structural diagram of a robot that may include a servo structure, a speed measurement apparatus, an operation module, a wireless signal receiving and measurement module, a power supply system, and a map data storage module.

Parameter configuration needs to be first performed on the mobile terminal before the indoor positioning function is enabled. Parameters that need to be configured include an expected journey and a delay time. A terminal such as a smartphone may perform configuration and storage using a parameter configuration page of an indoor positioning application. For another mobile terminal (such as a robot), configuration parameter may be entered using a touchscreen, or the like.

The following describes an entire working procedure of indoor positioning of the mobile terminal.

When not using a positioning function, a user disables an indoor positioning application of the mobile terminal, or disables the positioning function using a touchscreen.

When using the positioning function, the user enables the indoor positioning application, or enables the positioning function using the touchscreen. After enabling, whether the speed measurement module sends a speed signal is first detected and a speed change is analyzed, a speed signal is always detected and analyzed in the entire positioning process, and a working mode of the mobile terminal is controlled online according to a detection and analysis result, and initial positioning calculation is completed using a received BLE signal sent by a locator device. A map and a positioning position are displayed if there is a screen.

If a speed signal is not measured by the mobile terminal, and duration with no speed signal received is greater than a switching time, the mobile terminal works in a fixed-frequency positioning mode. In this mode, the mobile terminal completes one time of positioning calculation each time when receiving a BLE signal periodically broadcast by the locator, and sends a positioning result to the display/execution module.

If the mobile terminal obtains a speed signal by means of measurement, but a speed value is equal to 0, and duration with the speed value continuously being equal to 0 is greater than a switching time, the mobile terminal stops receiving a BLE signal and performing positioning calculation in order to reduce power consumption of the mobile terminal. If possible, the wireless signal receiving and measurement module may be put in a dormant state in order to further reduce the power consumption. A low energy mode of the mobile terminal may be flexibly defined according to an actual situation.

If the mobile terminal obtains a speed signal by means of measurement, and duration with the speed value continuously being not 0 is greater than a switching time, the mobile terminal enters a variable-frequency positioning mode. In this mode, the mobile terminal records a previous positioning calculation time $t_{(i)}$ ($i \geq 1$) after completing previous positioning calculation. The operation module calculates a ratio $T_{(i)}=L/v_{(i)}$ of an expected journey L to a current speed $v_{(i)}$, performs next positioning calculation when another BLE signal of the locator device is received at a time point $t_{(i)}+T_{(i)}$ after a time interval $T_{(i)}$ starting from the previous positioning calculation, and sends a result to the display module.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present disclosure essentially, or the part contributing to the other approaches, or all or some of the technical solutions may be implemented in a form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method, comprising:
   determining, by the mobile terminal, an expected journey (L), wherein the L is an expected value of a distance traveled by the mobile terminal between two consecutive times of positioning the mobile terminal;
   obtaining, by the mobile terminal, a speed value (v) of the mobile terminal;
   determining, by the mobile terminal, a positioning frequency at which to position the mobile terminal, wherein the positioning frequency is a frequency at which a position of the mobile terminal is determined between the two consecutive times, and wherein a deviation between an actual distance traveled by the mobile terminal between the two consecutive times and the L traveled by the mobile terminal between the two consecutive times based on the positioning frequency is less than a specified threshold;
   adjusting, by the mobile terminal, a current positioning frequency to be the positioning frequency; and
   performing, by the mobile terminal, a positioning operation to determine one or more positions of the mobile terminal at one or more times according to the positioning frequency.

2. The method according to claim 1, further comprising:
   obtaining, by the mobile terminal, a second positioning time (t) of the mobile terminal according to the L and the v in response to triggering a first positioning operation comprising determining a first position of the mobile terminal; and
   triggering, by the mobile terminal, a second positioning operation comprising determining a second position of the mobile terminal at the t.

3. The method according to claim 2, wherein obtaining the t comprises obtaining, by the mobile terminal, a time interval (T) according to a formula T=L/v, wherein the T is equal to a ratio of the L to the v, and wherein the t is a sum value of a current moment determined by the mobile terminal and the T.

4. The method according to claim 1, further comprising:
   obtaining, by the mobile terminal, a traveled distance (L') of the mobile terminal by performing integration on the v in terms of time starting from a time point at which a first positioning operation comprising determining a first position of the mobile terminal is triggered; and
   adjusting, by the mobile terminal, the positioning frequency according to the L' and the L.

5. The method according to claim 1, wherein determining the L comprises:
   obtaining, by the mobile terminal, a positioning error (R) and lengths of closed paths that surround all unreachable regions in a positioning scenario;
   determining, by the mobile terminal, a value range of the L as 2R<L<(C/2) in response to a minimum closed path length (C) being greater than 4R;
   determining, by the mobile terminal, the value range of the L as 2R<L<(C$_1$/2) in response to the C not being greater than 4R, wherein C$_1$ is a minimum closed path length greater than 4R; and
   receiving, by the mobile terminal, an L selected by a user from the value range of the L.

6. The method according to claim 1, wherein determining the L comprises:
   determining, by the mobile terminal, a current positioning scenario; and
   determining, by the mobile terminal according to a preset correspondence between a positioning scenario and an L, the L corresponding to the current positioning scenario.

7. The method according to claim 1, further comprising:
   adjusting, by the mobile terminal, the positioning frequency according to the L and the v in response to the v not being equal to 0, and
   adjusting, by the mobile terminal, the positioning frequency to 0 in response to the v being equal to 0.

8. The method according to claim 1, wherein before obtaining the v, the method further comprises triggering, by the mobile terminal, a positioning operation comprising determining a first position of the mobile terminal.

9. The method according to claim 1, further comprising adjusting, by the mobile terminal, the positioning frequency to a preset fixed positioning frequency in response to the mobile terminal not being able to obtain the v.

10. An apparatus, comprising:
    a memory; and
    a processor coupled to the memory and configured to:
        determine an expected journey (L), wherein the L is an expected value of a distance traveled by the apparatus between two consecutive times of positioning the apparatus;
        obtain a speed value (v) of the apparatus;
        determine a positioning frequency at which to position the apparatus, wherein the positioning frequency is a frequency at which a position of the apparatus is determined between the two consecutive times, and wherein a deviation between an actual distance traveled by the apparatus between the two consecutive times and the L traveled by the apparatus between the two consecutive times based on the positioning frequency is less than a specified threshold;
        adjust a current positioning frequency to be the positioning frequency; and perform a positioning operation to determine one or more positions of the apparatus at one or more times according to the positioning frequency.

11. The apparatus according to claim 10, wherein the processor is further configured to:
obtain a second positioning time (t) according to the L and the v in response to a first positioning operation to determine a first position of the apparatus being triggered; and
trigger a second positioning operation to determine a second position of the apparatus at the t.

12. A mobile terminal, comprising:
a memory;
a processor connected to the memory;
an input apparatus connected to the processor; and
an output apparatus connected to the processor,
wherein by invoking an operation instruction stored in the memory, the processor is configured to:
determine an expected journey (L), wherein the L is an expected value of a distance traveled by the mobile terminal between two consecutive times of positioning the mobile terminal;
obtain a speed value (v) of the mobile terminal;
determine a positioning frequency at which to position the mobile terminal, wherein the positioning frequency is a frequency at which a position of the mobile terminal is determined between the two consecutive times, and wherein a deviation between an actual distance traveled by the mobile terminal between the two consecutive times and the L traveled by the mobile terminal between the two consecutive times based on the positioning frequency is less than a specified threshold;
adjust a current positioning frequency to be the positioning frequency; and
perform a positioning operation to determine one or more positions of the mobile terminal at one or more times according to the positioning frequency.

13. The mobile terminal according to claim 12, wherein the processor is further configured to:
obtain a second positioning time (t) of the mobile terminal according to the L and the v in response to triggering a first positioning operation to determine a second position of the mobile terminal; and
trigger a second positioning operation to determine a second position of the mobile terminal at the t.

14. The mobile terminal according to claim 13, wherein the processor is further configured to:

obtain a time interval (T) according to a formula $T=L/v$, wherein the T is equal to a ratio of the L to the v; and
determine the t as a sum value of a current moment determined by the mobile terminal and the T.

15. The mobile terminal according to claim 12, wherein the processor is further configured to:
obtain a traveled distance (L') of the mobile terminal by performing integration on the v in terms of time starting from a time point at which a first positioning operation to determine a first position of the mobile terminal is triggered; and
adjust the positioning frequency according to the L' and the L.

16. The mobile terminal according to claim 12, wherein the processor is further configured to:
obtain a positioning error (R) and lengths of closed paths that surround all unreachable regions in a positioning scenario;
determine a value range of the L as $2R<L<(C/2)$ in response to a minimum closed path length (C) being greater than 4R;
determine the value range of the L as $2R<L<(C_1/2)$ the C not being greater than 4R, wherein $C_1$ is a minimum closed path length greater than 4R; and
receive an L selected by a user from the value range of the L.

17. The mobile terminal according to claim 12, wherein the processor is further configured to:
determine a current positioning scenario; and
determine, according to a preset correspondence between a positioning scenario and an L, the L corresponding to the current positioning scenario.

18. The mobile terminal according to claim 12, wherein the processor is further configured to:
adjust the positioning frequency according to the L and the v in response to the v not being equal to 0; and
adjust the positioning frequency to 0 in response to the v being equal to 0.

19. The mobile terminal according to claim 12, wherein before obtaining the v, the processor is further configured to trigger a positioning operation to determine a first position of the mobile terminal.

20. The mobile terminal according to claim 12, wherein the processor is further configured to adjust the positioning frequency to a preset fixed positioning frequency when the v cannot be obtained.

* * * * *

UNITED STATES PATENT AND TRADEMARK OFFICE
CERTIFICATE OF CORRECTION

PATENT NO. : 10,520,595 B2
APPLICATION NO. : 15/502004
DATED : December 31, 2019
INVENTOR(S) : Xiaoping Zhang It is certified that error appears in the above-identified patent and that said Letters Patent is hereby corrected as shown below:

In the Claims

Claim 13, Column 51, Line 43: "determine a second" should read "determine a first"

Signed and Sealed this
Twenty-fifth Day of February, 2020

Andrei Iancu
*Director of the United States Patent and Trademark Office*